(12) United States Patent
Takakura et al.

(10) Patent No.: US 11,252,781 B2
(45) Date of Patent: Feb. 15, 2022

(54) UE AND COMMUNICATION METHOD THEREOF

(71) Applicants: SHARP KABUSHIKI KAISHA, Sakai (JP); FG Innovation Company Limited, Tuen Mun (HK)

(72) Inventors: Tsuyoshi Takakura, Sakai (JP); Masafumi Aramoto, Sakai (JP)

(73) Assignees: SHARP KABUSHIKI KAISHA, Osaka (JP); FG Innovation Company Limited, New Territories (HK)

( * ) Notice: Subject to any disclaimer, the term of this patent is extended or adjusted under 35 U.S.C. 154(b) by 0 days.

(21) Appl. No.: 17/045,935

(22) PCT Filed: Apr. 9, 2019

(86) PCT No.: PCT/JP2019/015487
§ 371 (c)(1),
(2) Date: Oct. 27, 2020

(87) PCT Pub. No.: WO2019/198717
PCT Pub. Date: Oct. 17, 2019

(65) Prior Publication Data
US 2021/0176817 A1    Jun. 10, 2021

(30) Foreign Application Priority Data
Apr. 9, 2018  (JP) ............................. JP2018-074587

(51) Int. Cl.
*H04W 76/50* (2018.01)
*H04W 76/18* (2018.01)
*H04W 4/90* (2018.01)
(52) U.S. Cl.
CPC ............. *H04W 76/50* (2018.02); *H04W 4/90* (2018.02); *H04W 76/18* (2018.02)

(58) Field of Classification Search
CPC ........ H04W 76/18; H04W 76/50; H04W 4/90
(Continued)

(56) References Cited

U.S. PATENT DOCUMENTS

2005/0090255 A1* 4/2005 Kuchibhotla ......... H04W 48/12
455/435.2
2009/0191841 A1* 7/2009 Edge ..................... H04M 7/127
455/404.1
(Continued)

FOREIGN PATENT DOCUMENTS

CN        106797548 A       5/2017
CN        106878988 A       6/2017
(Continued)

OTHER PUBLICATIONS

Intel Corporation, "Emergency calls in Standalone NR", R2-1802966, 3GPP TSG-RAN WG2 Meeting #101, Athens, Greece, Feb. 26-Mar. 2, 2018.

*Primary Examiner* — Joel Ajayi
(74) *Attorney, Agent, or Firm* — ScienBiziP, P.C.

(57) ABSTRACT

A User Equipment (UE) including a controller configured to perform, in a case of failure of a connection attempt for a first emergency call that uses a Packet Switched (PS) domain, a connection attempt for a second emergency call that uses the PS domain, a transmission and/or reception unit configured to receive a service reject message due to the failure of the connection attempt for the first emergency call, wherein the UE uses a first access network for the connection attempt for the first emergency call, and the UE uses a second access network for the connection attempt for the second emergency call. Accordingly, a user equipment, a core network apparatus, a control method to be performed by an IMS apparatus, and the like are provided for the user equipment to connect to a network suitable for an emergency (Continued)

call service in 5th generation (5G) mobile communication system, which is a next-generation mobile communication system.

14 Claims, 13 Drawing Sheets

(58) Field of Classification Search
USPC .................................................. 455/404.1
See application file for complete search history.

(56) References Cited

U.S. PATENT DOCUMENTS

| | | |
|---|---|---|
| 2010/0172288 A1 | 7/2010 | Vachhani |
| 2010/0240338 A1 | 9/2010 | Mallick et al. |
| 2014/0045448 A1 | 2/2014 | Mallick et al. |
| 2015/0111571 A1 | 4/2015 | Tanikawa et al. |
| 2016/0212603 A1* | 7/2016 | Chen ................ H04W 48/14 |
| 2017/0230809 A1 | 8/2017 | Dm et al. |
| 2017/0366955 A1 | 12/2017 | Edge |
| 2018/0234903 A1* | 8/2018 | Jheng ............. H04W 36/0066 |

FOREIGN PATENT DOCUMENTS

| | | |
|---|---|---|
| CN | 107113708 A | 8/2017 |
| EP | 2723126 A1 | 4/2014 |
| JP | 2010-528494 A | 8/2010 |
| JP | 2013-258486 A | 12/2013 |
| JP | 2016-103778 A | 6/2016 |
| WO | 2016/091328 A1 | 6/2016 |

\* cited by examiner

UE AND COMMUNICATION METHOD THEREOF

TECHNICAL FIELD

The present application relates to a UE and a communication method for the UE. This application claims priority based on JP 2018-074587 filed on Apr. 9, 2018 in Japan, the contents of which are incorporated herein in its entirety by reference.

BACKGROUND ART

The 3rd Generation Partnership Project (3GPP), which undertakes activities for standardizing recent mobile communication systems, has studied System Architecture Evolution (SAE), which is a system architecture of Long Term Evolution (LTE). The 3GPP is in the process of standardizing Evolved Packet System (EPS) as a communication system for realizing an all-Internet Protocol (IP) architecture. Note that a core network that configures the EPS is referred to as an Evolved Packet Core (EPC), and an access network that configures the EPS is referred to as an Evolved Universal Terrestrial Radio Access Network (E-UTRAN).

Also, in order to provide an emergency call service on an all-IP network, a system called IP Multimedia Subsystem (IMS) needs to be supported.

Additionally, the 3GPP has recently studied next-generation communication technologies and system architectures for a 5th generation (5G) mobile communication system which is a next generation mobile communication system, and in particular, has standardized a 5G system (5GS) as a system for implementing a 5G mobile communication system (see NPL 1 and NPL 2). In the 5GS, technical problems attributable to connection of various terminals to a cellular network are extracted to standardize solutions.

For example, specifications for a core network and an access network for supporting an emergency call service, optimization of the IMS, and the like have been studied (see NPL 1, NPL 2, and, NPL 5).

CITATION LIST

Non Patent Literature

Non Patent Literature 1: 3GPP TS 23.501 v15.0.0; 3rd Generation Partnership Project; Technical Specification Group Services and System Aspects; System Architecture for the 5G system; Stage 2 (Release 15)

Non Patent Literature 2: 3GPP TS 23.502 v15.1.0; 3rd Generation Partnership Project; Technical Specification Group Services and System Aspects; Procedures for the 5G system; Stage 2 (Release 15)

Non Patent Literature 3: 3GPP TS 24.501 v1.0.0; 3rd Generation Partnership Project; Technical Specification Group Core Network and Terminals; Non-Access-Stratum (NAS) protocol for 5G System (5GS); Stage 3 (Release 15)

Non Patent Literature 4: 3GPP TS 24.502 v0.4.0; 3rd Generation Partnership Project; Technical Specification Group Core Network and Terminals; Access to the 3GPP 5G Core Network (SGCN) via non-3GPP access networks; Stage 3 (Release 15)

Non Patent Literature 5: 3GPP TS 24.301 v15.2.0; 3rd Generation Partnership Project; Technical Specification Group Core Network and Terminals; Non-Access-Stratum (NAS) protocol for Evolved Packet System (EPS); Stage 3 (Release 15)

Non Patent Literature 6: 3GPP TS 23.401 v15.3.0; 3rd Generation Partnership Project; Technical Specification Group Services and System Aspects, General Packet Radio Service (GPRS) enhancements for Evolved Universal Terrestrial Radio Access Network (E-UTRAN) access (Release 15)

Non Patent Literature 7: 3GPP TS 24.229 v15.2.0; 3rd Generation Partnership Project; Technical Specification Group Core Network and Terminals; IP multimedia call control protocol based on Session Initiation Protocol (SIP) and Session Description Protocol (SDP); Stage 3 (Release 15)

Non Patent Literature 8: 3GPP TS 23.228 v15.2.0; 3rd Generation Partnership Project; Technical Specification Group Services and System Aspects; IP Multimedia Subsystem (IMS); Stage 2 (Release 15)

SUMMARY OF INVENTION

Technical Problem

With respect to the 5GS, a known IMS being applied to the 5GS to support mobile communication voice call services has been studied.

More specifically, technical specifications have been studied to provide a mobile communication emergency call service suitable for a terminal and a network apparatus by exchanging various kinds of capability information in an emergency call service between a terminal, an access network, and/or a core network apparatus and exchanging various kinds of capability information in an emergency call service between a UE and an IMS apparatus.

The network performs notification of various pieces of capability information of the network related to the emergency call service for a registration request from the UE. In a case of placing an emergency call, the UE connects to an optimal access network and/or core network and implements an emergency call, based on the capability information. With respect to the emergency call service, the capability information notified to the UE by the network roughly includes three types of information; specifically, information as to whether a voice service is supported, information as to whether an emergency call service is supported, and information as to whether the access network supports a function of enabling handover and/or redirection to the access network and/or the core network optimal for the emergency call service. In emergency call service support notification, the 5GS is capable of notification of four support requirements of a case that a 5G Core Network (5GC) does not support the emergency call service, a case that the emergency call service via the New Radio (NR) connected to 5GC is supported, a case that the emergency call service via the E-UTRA connected to 5GC is supported, and a case that the emergency call service via the NR connected to 5GC and the E-UTRA connected to 5GC is supported. Here, the UE that has received the support notification of the function for enabling handover and/or redirection to the access network and/or the core network optimal for the emergency call service performs a procedure for initiating a handover and/or redirection procedure by the network using a dedicated service request (SERVICE REQUEST) in a case that the 5GS does not support the emergency call service. However, a solution for the UE to switch to the access network and/or the core network optimal for the emergency call service in a case that the 5GS supports the emergency call service is not disclosed.

Furthermore, there is no assurance that the optimal access network and/or core network supports the voice service in a case that the core network performs the support notification of the function for enabling the handover and/or redirection to the access network and/or the core network optimal for the emergency call service. In this case, the voice service is not supported despite switching to the access network and/or the core network optimal for the emergency call service. This causes another execution of the procedure of switching to the access network and/or the core network optimal for the emergency call service, generating a delay in the emergency call connection using voice. A solution for this problem is not disclosed either.

Furthermore, in a case that the procedure for forestalling a wrong emergency call connection described in the above is not applied and the wrong emergency call connection is performed by the UE, the emergency call connection fails. A solution for performing a procedure of switching the emergency call connection to an optimal access network and/or core network after such failure is not disclosed either.

An object of the present invention is to provide a unit and the like for implementing connection to the network that is most suitable for the emergency call service by exchanging various kinds of capability information in the emergency call service between various access networks and/or core network apparatuses.

Solution to Problem

A User Equipment (UE) including a controller configured to perform, in a case of failure of a connection attempt for a first emergency call that uses a Packet Switched (PS) domain, a connection attempt for a second emergency call that uses the PS domain; a transmission and/or reception unit configured to receive a service reject message due to the failure of the connection attempt for the first emergency call, wherein the UE uses a first access network for the connection attempt for the first emergency call, and the UE uses a second access network for the connection attempt for the second emergency call.

Advantageous Effects of Invention

According to the present invention, a terminal can fast be connected to a most suitable network for an emergency call service. Furthermore, a 5GS and an IMS can perform a network-initiated control of behaviors of a terminal such that the terminal is connected to a network that is most suitable for emergency call, and provide a safer and more secured mobile communication service.

DESCRIPTION OF EMBODIMENTS

A preferred embodiment for carrying out the present invention will be described below with reference to the drawings. Note that, as an example, an embodiment of a mobile communication system to which the present invention is applied will be described in the present embodiment.

1. System Overview

A mobile communication system according to the present embodiment will be described with reference to FIG. 1, FIG. 2, and FIG. 3.

Figure 1:
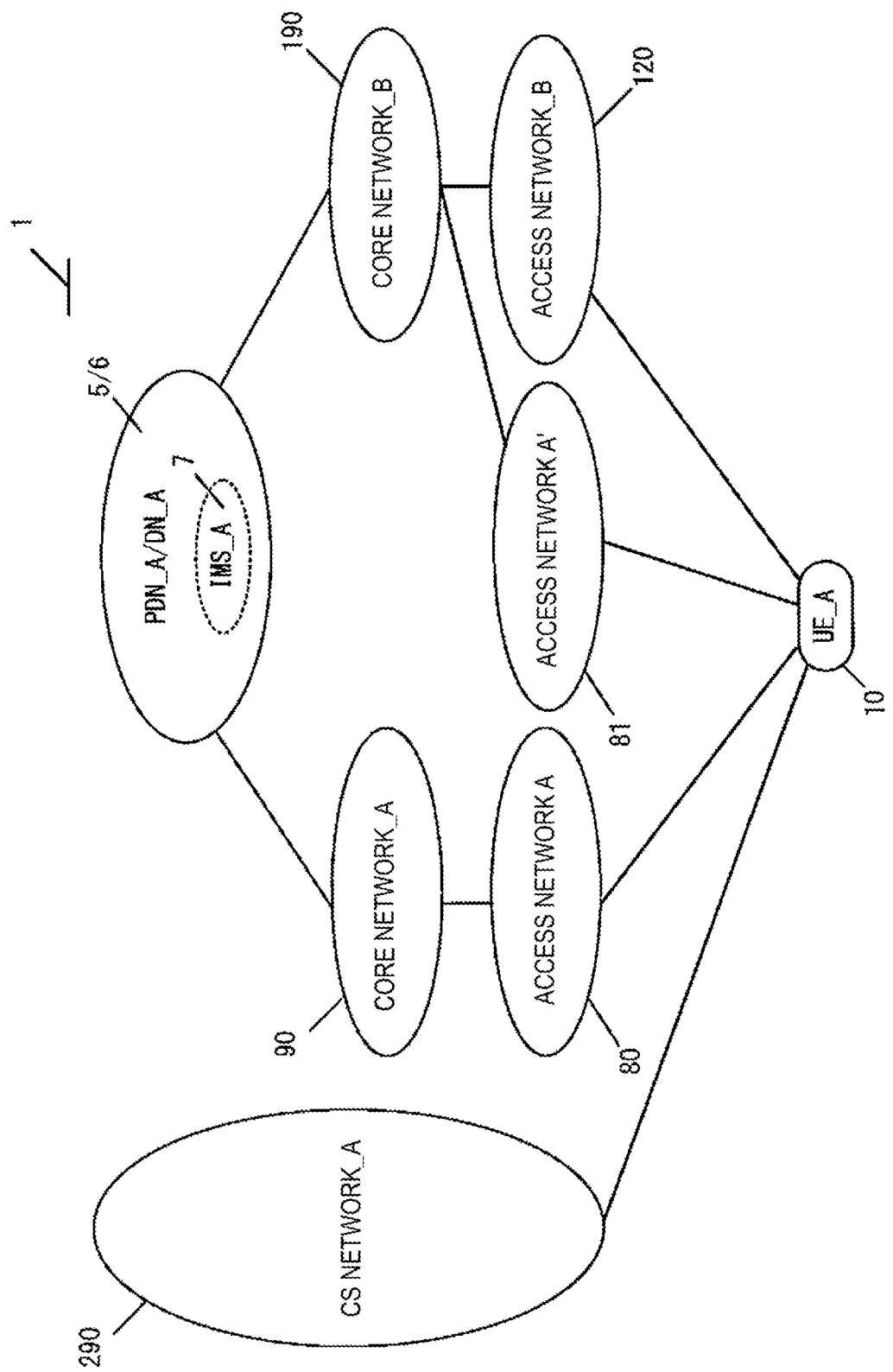
FIG. 1 is a diagram illustrating an overview of a mobile communication system.

FIG. 1 is a diagram illustrating an overview of a mobile communication system 1. FIG. 2 is a diagram illustrating an example of a configuration of access networks and a core network in the mobile communication system of FIG. 1. FIG. 3 is a diagram mainly illustrating an example of a connection configuration of an IP Multimedia Subsystem (IMS) and core networks in the mobile communication system of FIG. 1.

As illustrated in FIG. 1, the mobile communication system 1 according to the present embodiment includes User Equipment (UE)_A 10 (which is also referred to as a user apparatus, a terminal apparatus or a mobile terminal apparatus), Circuit Switched (CS) network_A 290 (which is also referred to as a circuit switched network), an Access Network (AN)_A 80, an access network_A' 81, an access network_B 120, and a Core Network (CN)_B 190, a core network_A 90, a Data Network (DN)_A 5, a Packet Data Network (PDN)_A 6, and an IMS_A 7. Note that, for the sake of simplicity, the core network_A, and/or the core network_B, and/or the CS network_A, or a combination thereof may also be referred to as a core network, and the access network_A, and/or the access network_A', and/or the access network_B, and/or the CS network_A, or a combination thereof may also be referred to as an access network or a radio access network, and the DN_A 5, the PDN_A 6, or a combination thereof may also be referred to as a DN. In particular, the CS network_A may be referred to as a circuit switched network or a CS network. Note that the access network_A 80, the access network_A' 81, the access network_B 120, the core network_B 190, the core network_A 90, the data network_A 5, the packet data network_B 6, and the IMS_A 7 may be referred to as a Packet Switched (PS) network or a PS domain.

Furthermore, the core network_A, and/or the core network_B, and/or the CS network_A, and/or one or more apparatuses or functions included in these core networks may be referred to as a core network or a core network apparatus.

In other words, a case that the core network and/or the core network apparatus transmits and/or receives a message and/or performs a procedure may mean that the core network_A, and/or the core network_B, and/or the CS network_A, and/or the one or more apparatuses or functions included in these core networks transmit and/or receive a message and/or perform a procedure.

Furthermore, the EPS being a 4G system includes the UE, the access network_A, and the core network_A, and may further include the PDN.

Furthermore, the 5GS being a 5G system includes the UE, the access network_B, the access network_A', and the core network_B, and may further include the DN. Furthermore, a base station (eNB and/or ng-eNB) of the access network_A' and a base station (gNB) of the access network_B may or may not be connected to each other via the Xn interface, for example.

Furthermore, 3G being an old system is configured with a Universal Mobile Telecommunications System (UMTS), and includes a UMTS Terrestrial Radio Access Network (UTRAN). Furthermore, 2G being an old system is configured with global system for mobile communications (trade name) (GSM), and includes a GSM (trade name) EDGE Radio Access Network (GERAN). Note that radio access provided by the old systems of the UMTS and the GSM (trade name) may be referred to as 2G/3G.

Note that a core network_A corresponds to an Evolved Packet Core (EPC). In the EPC, for example, an MME, an SGW, a PGW, a Policy and Charging Rules Function (PCRF), a Home Subscriber Server (HSS), and the like are deployed.

Furthermore, the core network_B corresponds to a 5G Core Network (5GC). In the 5GC, for example, an AMF, a UPF, an SMF, a Policy Control Function (PCF), a Unified Data Management (UDM), and the like are deployed.

Furthermore, the CN network_A 290 is a network for the 2G/3G system, and may include a radio access network for the 2G/3G system and/or an apparatus for a voice service to be described later.

Here, the UE_A 10 may be an apparatus that can connect to a network service via 3GPP access (also referred to as 3GPP access or a 3GPP access network) and/or non-3GPP access (also referred to as non-3GPP access or a non-3GPP access network). In addition, the UE_A 10 may also include a Universal Integrated Circuit Card (UICC) and an embedded UICC (eUICC). Furthermore, the UE_A 10 may be a wirelessly connectable terminal apparatus and may be Mobile Equipment (ME), a Mobile Station (MS), a cellular Internet of Things (CIoT) terminal (CIoT UE), or the like.

In addition, the UE_A 10 can be connected to an access network and/or core network. In addition, the UE_A 10 can be connected to the DN_A 5 and/or the PDN_A 6 via the access network and/or the core network. The UE_A 10 transmits and/or receives (communicates) the user data to and/or from the DN_A 5 and/or the PDN_A 6 by using a Protocol Data Unit or Packet Data Unit (PDU) session and/or a Packet Data Network (PDN) connection (PDN connection). Furthermore, the communication of the user data is not limited to Internet Protocol (IP) communication, and may be non-IP communication.

Here, IP communication is data communication using IP, and is data communication achieved by transmitting and/or receiving an IP packet including an IP header. Note that a payload section constituting the IP packet may include the user data transmitted and/or received by the UE_A 10. Furthermore, non-IP communication is data communication without using IP, and is data communication achieved by transmitting and/or receiving data without IP header. For example, non-IP communication may be the data communication achieved by transmitting and/or receiving application data without IP header, or may transmit and/or receive the user data, transmitted and/or received by the UE_A 10, that includes another header such as Media Access Control (MAC) header or Ethernet (registered trademark) frame header.

In addition, a PDU session or a PDN connection is connectivity established between the UE_A 10 and the DN_A 5 and/or the PDN_A 6 to provide a PDU connection service. To be more specific, the PDU session or the PDN connection may be connectivity established between the UE_A 10 and an external gateway. Here, the external gateway may be a User Plane Function (UPF), a Packet Data Network Gateway (PGW), a Service Capability Exposure Function (SCEF), or the like. Furthermore, the PDU session or the PDN connection may be a communication path established to transmit and/or receive the user data between the UE_A 10 and the core network and/or the DN, or a communication path established to transmit and/or receive the PDU. Furthermore, the PDU session or the PDN connection may be a session established between the UE_A 10 and the core network and/or the DN, or may be a logical communication path including a transfer path such as one or more flows or bearers and the like between apparatuses in the mobile communication system 1. To be more specific, the PDU session or the PDN connection may be a connection established between the UE_A 10 and the core network and/or the external gateway, or a connection established between the UE_A 10 and a UPF_A 235 or a PGW_A 30. Note that the PDN connection may be connection and/or a connection between the UE_A 10 and the PGW_A 30 via an evolved NodeB (eNB)_A 45 and/or a Serving Gateway (SGW)_A 35, or connectivity and/or a connection between the UE_A 10 and an SCEF via the eNB_A 45 and/or a Mobility Management Entity (MME)_A 40. Furthermore, the PDU session may be connectivity and/or a connection between the UE_A 10 and the UPF_A 235 via a gNB_A 122 or an eNB_B 145. Furthermore, the PDN connection may be identified by a PDN connection ID, and the PDU session may be identified by a PDU session ID. Furthermore, the PDN connection and the PDU session may be identified by an EPS bearer ID. Note that, for simplicity, the PDU session and/or the PDN connection may be referred to as a PDU session.

Note that the UE_A 10 can transmit and/or receive the user data to and/or from an apparatus, such as an application server, that is located in the DN_A 5 and/or the PDN_A 6 by using the PDU session or the PDN connection. In other words, the PDU session or the PDN connection can transfer the user data transmitted and/or received between the UE_A 10 and the apparatus, such as an application server, that is located in the DN_A 5 and/or the PDN_A 6. Furthermore, each apparatus (the UE_A 10, an apparatus in the access network, and/or an apparatus in the core network) may associate one or more pieces of identification information with the PDU session or the PDN connection for management. Note that these pieces of identification information may include at least one of an Access Point Name (APN), a Traffic Flow Template (TFT), a session type, application identification information, identification information of the DN_A 5 and/or the PDN_A 6, Network Slice Instance (NSI) identification information, Dedicated Core Network (DCN) identification information, or access network identification information, or may further include other information. Furthermore, in a case that multiple PDU sessions are established, respective pieces of identification information associated with the PDU sessions or the PDN connections may have the same content or different content. Furthermore, the NSI identification information is information for identifying an NSI, and hereinafter may be an NSI ID or a Slice Instance ID.

In addition, the access network_A and/or the access network_A' and/or the access network_B may be any of an Evolved Universal Terrestrial Radio Access Network (E-UTRAN)_A 80, a Universal Terrestrial Radio Access Network (UTRAN)_A 20, a GERAN_A 25, a WLAN ANb 75, a WLAN ANa 70, a NG-RAN_A 120, and a WLAN ANc 125. Note that the E-UTRAN_A 80 and/or the NG-RAN_A 120 and/or the UTRAN_A 20 and/or the GERAN_A 25 may also be referred to as 3GPP access networks, and the WLAN ANb 75 and/or the WLAN Ana 70 and/or the WLAN ANc 125 may be referred to as non-3GPP access networks. Each radio access network includes an apparatus to which the UE_A 10 is actually connected (e.g., a base station apparatus or an access point), and the like. Note that, in this specification, the radio access networks and its constituent apparatuses are also collectively referred to as a radio access system.

For example, the E-UTRAN_A 80 is an access network for Long Term Evolution (LTE) and configured to include one or more eNBs_A 45. The eNB_A 45 is a radio base station to which the UE_A 10 connects through Evolved Universal Terrestrial Radio Access (E-UTRA). Furthermore, in a case that multiple eNBs are present in the E-UTRAN_A 80, the multiple eNBs may be connected to each other.

Furthermore, the NG-RAN_A 120 is a 5G access network, and configured to include one or more gNBs (NR nodesB)_A 122. The gNB_A 122 is a radio base station to which the UE_A 10 connects with 5G radio access. Also, in a case that there are multiple gNBs_A 122 in the NG-RAN_A 120, the multiple gNBs_A 122 may be connected to each another. Note that the gNB may also be referred to as a New Radio Access Technology node (NR node).

Note that the NG-RAN_A 120 may be an access network configured in the E-UTRA and/or the 5G Radio Access. In other words, in the NG-RAN_A 120, the eNB_A 45 and/or the gNB_A 122 and/or the eNB_B 145 may be included. In this case, the eNB_A 45 and the gNB_A 122 may be similar apparatuses. Therefore, the gNB_A 122 can be substituted with the eNB_A 45 and/or eNB_B 145.

Note that, in this specification, the eNB connected to the core network_A may also be referred to as an eNB_A, the eNB connected to the core network_B may also be referred to as an eNB_B 145 or an Ng-eNB, and the gNB connected to the core network_A may be referred to as an en-gNB. Furthermore, the radio access network including the gNB connected to the 5G network is also referred to as a first radio access system or the access network_A', and the radio access network including the eNB_B connected to the 5G network is also referred to as a second radio access system. Furthermore, the access network_B connected to the core network_B is also referred to as a first access network, the access network_A' connected to the core network_B is also referred to as a second access network, and the access network_A connected to the core network_A is also referred to as a third access network.

Furthermore, aspects of access network and core network connection in this specification may include the access network_B (New Radio (NR)) connected to 5GC connected to the core network_B, and/or the access network_A' (E-UTRA connected to 5GC) connected to the core network_B, and/or the access network_A (E-UTRA connected to EPC) connected to the core network_A, and/or the CS network (for the sake of simplicity, the access network and the core network are expressed as one network).

Furthermore, an interface for communication between access network apparatuses may be provided, an interface between the access network apparatuses connected to the core network_A may be referred to as the X2 interface, and an interface between the access network apparatuses connected to the core network_B may be referred to as the Xn interface. In other words, for example, the Xn interface may be used for communication between multiple gNBs and/or between multiple Ng-eNBs and/or between multiple gNBs and Ng-eNBs that are connected to the core network_B, and the X2 interface may be used for communication between multiple gNBs and/or multiple Ng-eNBs and/or multiple gNBs and Ng-eNBs that are connected to the core network_A. Here, communication between the access network apparatuses may be transmission and/or reception of control information, may be transferring of user data between the UE_A 10 and the network, and is not limited to these.

Note that, in the present specification, the expression "the UE_A 10 is connected to each radio access network" is equivalent to "the UE_A 10 is connected to a base station apparatus, an access point, or the like included in each radio access network," and is equivalent to "transmitted and/or received data, signals, and the like are also transferred through the base station apparatus and the access point." Note that control messages transmitted and/or received between the UE_A 10 and the core network_B 190 may be the same control message, regardless of a type of the access network. Therefore, the expression "the UE_A 10 and the core network_B 190 transmit and/or receive a message to and/or from each other via the gNB_A 122" may be equivalent to "the UE_A 10 and the core network_B 190 transmit a message to each other via the eNB_A 45 and/or the eNB_B 145."

Furthermore, the access network is a radio network connecting with the UE_A 10 and/or the core network. The access network may be a 3GPP access network, or a non-3GPP access network. Note that the 3GPP access network may be the UTRAN_A 20 and/or the GERAN and/or the E-UTRAN_A 80 and/or the NG-Radio Access Network (RAN)_A 120, and the non-3GPP access network may be the WLAN ANb 75 and/or the WLAN ANa 72 and/or the WLAN ANc 125. Note that the UE_A 10 may connect to the access network or to the core network via the access network in order to connect to the core network.

In addition, the DN_A 5 and/or the PDN_A 6 is a data network or a packet data network that provides communication services to the UE_A 10, may be configured as a packet data service network, and may be configured for each service. For example, there may be the DN_A 5 and/or the PDN_A 6 that provides IMS services, and the DN_A 5 and/or the PDN_A 6 may include an apparatus that provides IMS services. In other words, the DN_A 5 and/or the PDN_A 6 may be configured as an IMS_A 7, the DN_A 5 and/or the PDN_A 6 may include the IMS_A 7, and the IMS_A 7 may provide the UE_A 10 with a normal call connection service and/or an emergency call connection service for voice services and/or a normal call connection service and/or an emergency call connection service for text message services. Note that the following description only illustrates the normal call connection service and/or the emergency call connection service for the voice services. However, the present invention can be carried out for the normal call connection service and/or the emergency call connection service for the text message services as well in a similar manner. Furthermore, the DN_A 5 and/or the PDN_A 6 may include a connected communication terminal. Therefore, connecting to the DN_A 5 and/or the PDN_A 6 may be connecting to a communication terminal or a server apparatus deployed in the DN_A 5 and/or the PDN_A 6. Furthermore, the transmission and/or reception of the user data to and/or from the DN_A 5 and/or the PDN_A 6 may be transmission and/or reception of the user data to and/or from the communication terminal or the server apparatus deployed in the DN_A 5 and/or the PDN_A 6. In addition, although the DN_A 5 and/or the PDN_A 6 is outside the core networks in FIG. 1, they may be within the core networks.

Furthermore, the core network_A 90 and/or the core network_B 190 and/or CS network_A 290 may be configured as one or more core network apparatuses. Here, the core network apparatuses may be apparatuses that perform part or all of processing or functions of apparatuses included in the core network_A 90 and/or the core network_B 190 and/or CS network_A 290.

Furthermore, the core network is an IP mobile communication network, operated by a Mobile Network Operator (MNO), that connects to the access network and/or the DN. The core network may be a core network for a mobile communication operator that operates and manages the mobile communication system 1, or may be a core network for a virtual mobile communication operator such as a Mobile Virtual Network Operator (MVNO) and a Mobile Virtual Network Enabler (MVNE), or a virtual mobile communication service provider. Note that the core network_A 90 may be an Evolved Packet Core (EPC) constituting an Evolved Packet System (EPS), and the core network_B 190 may be a 5G Core Network (5GC) constituting a 5GS. Conversely, the EPC may be the core network_A 90, and the 5GC may be the core network_B 190. Furthermore, the core network_B 190 may be a core network for a system providing the 5G communication service. Note that the core network_A 90 and/or the core network_B 190 and/or the CS network_A 290 is not limited to the above, and may be a network for providing a mobile communication service. In the following, in this specification, the 5GS may also be referred to as a first network system and the EPS may also be referred to as a second network system. Furthermore, the 5GC may also be referred to as a first core network, and the EPC may also be referred to as a second core network. Furthermore, the first radio access system and/or the second radio access system and/or the first network system and/or the second network system described above are collectively simply also referred to as a network.

Next, the core networks will be described. In the present embodiment, configuration examples of the core network_A 90 and core network_B 190 will be described. Note that the core networks may be the core network_A 90, the core network_B 190, the CS network_A 290, or a combination thereof.

The core network_A 90 may include at least one of a Home Subscriber Server (HSS)_A 50, an Authentication Authorization Accounting (AAA), a Policy and Charging Rules Function (PCRF), the PGW_A 30, an ePDG, the SGW_A 35, the Mobility Management Entity (MME)_A 40, a Serving GPRS Support Node (SGSN), and an SCEF. Furthermore, these may also be configured as Network Functions (NFs). The NF may be a processing function included in a network. In addition, the core network_A 90 is capable of connecting to multiple radio access networks (the UTRAN_A 20, the GERAN_A 25, the E-UTRAN_A 80, the WLAN ANb 75, and the WLAN ANa 70).

Figure 2:
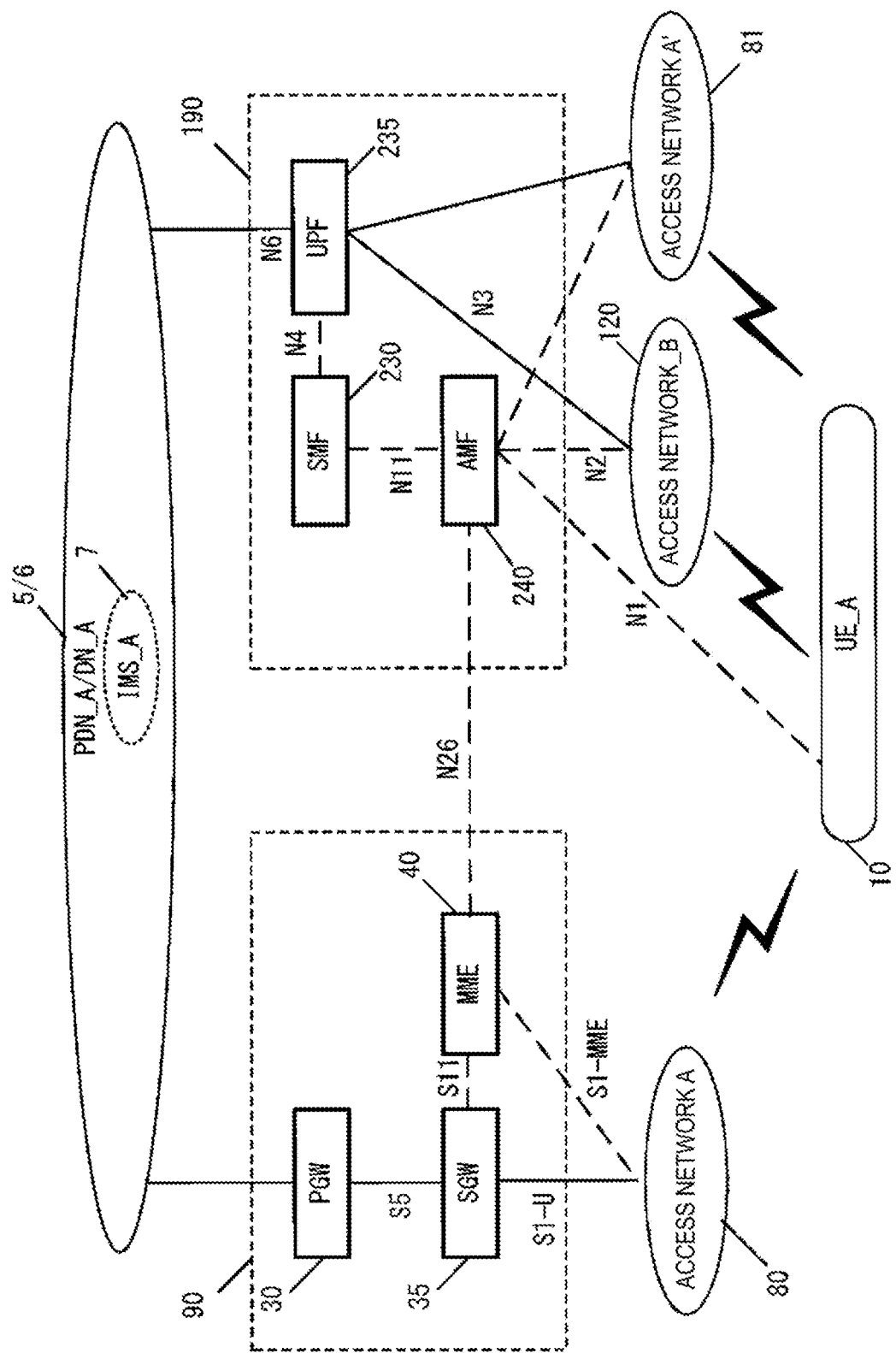
FIG. 2 is a diagram illustrating an example of a configuration and the like of a core network and access networks in the mobile communication system.

Although only the PGW (PGW_A 30), the SGW (SGW_A 35), and the MME (MME_A 40) among the network elements are described in FIG. 2 for simplicity, it does not mean that no other apparatuses and/or NFs are included therein. Note that the UE_A 10 will also be referred to as UE, the HSS_A 50 as an HSS, the PGW_A 30 as a PGW, the SGW_A 35 as a SGW, the MME_A 40 as an MME, and the DN_A 5 and/or the PDN_A 6 as a DN for simplicity.

Furthermore, solid lines or dotted lines indicate interfaces between apparatuses in FIG. 2. Here, the solid lines indicate interfaces for U-Plane, and the dotted lines indicate interfaces for C-Plane.

First, a brief description of each apparatus included in the core network_A 90 will be provided.

The PGW_A 30 is a relay apparatus that is connected to the DN, the SGW_A 35, the ePDG, the WLAN ANa 70, the PCRF, and the AAA, and transfers the user data as a gateway between the DN (the DN_A 5 and/or the PDN_A 6) and the core network_A 90. Note that the PGW_A 30 may serve as a gateway for the IP communication and/or non-IP communication. Furthermore, the PGW_A 30 may have a function to transfer the IP communication, or may have a function to perform conversion between the non-IP communication and the IP communication. Note that multiple gateways like this may be deployed in the core network_A 90. Furthermore, the multiple gateways deployed may serve as gateways for connecting the core network_A 90 with a single DN.

Note that a User Plane (U-Plane or UP) may be a communication path for transmitting and/or receiving user data, and may include multiple bearers. Furthermore, a Control Plane (C-Plane or CP) may be a communication path for transmitting and/or receiving a control message, and may include multiple bearers.

Further, the PGW_A 30 may be connected to a User Plane Function (UPF) and a Session Management Function (SMF) or may be connected to the UE_A 10 via the U-Plane. Furthermore, the PGW_A 30 may be configured integrally with the UPF_A 235 and/or the SMF_A 230.

The SGW_A 35 is a relay apparatus that is connected to the PGW_A 30, the MME_A 40, the E-UTRAN_A 80, the SGSN, and the UTRAN_A 20, and transfers the user data as a gateway between the core network_A 90 and the 3GPP access networks (the UTRAN_A 20, the GERAN_A 25, and the E-UTRAN_A 80).

The MME_A 40 is a control apparatus that is connected to the SGW_A 35, the access network, the HSS_A 50, and the SCEF, and performs location information management including mobility management of the UE_A 10 via the access network, and access control. Furthermore, the MME_A 40 may include a function as a session management device to manage a session established by the UE_A 10. Multiple control apparatuses like this may be deployed in the core network_A 90, and, for example, a location management apparatus different from the MME_A 40 may be configured. Like the MME_A 40, the location management apparatus different from the MME_A 40 may be connected to the SGW_A 35, the access network, the SCEF, and the HSS_A 50.

Furthermore, in a case that multiple MMEs are included in the core network_A 90, the multiple MMEs may be connected to each other. With this configuration, a context of the UE_A 10 may be transmitted and/or received between the MMEs. In this way, the MME_A 40 is a management apparatus to transmit and/or receive the control information related to the mobility management and the session management to and/or from the UE_A 10. In other words, the MME_A 40 may be a control apparatus for a Control Plane (C-Plane; CP).

The example is described in which the MME_A 40 is configured to be included in the core network_A 90, but the MME_A 40 may be a management apparatus configured in one or multiple core networks, DCNs, or NSIs, or may be a management apparatus connected to one or multiple core networks, DCNs, or NSIs. Here, multiple DCNs or NSIs may be operated by a single network operator, or by different network operators respectively.

The MME_A 40 may be a relay apparatus for transferring the user data as a gateway between the core network_A 90 and the access network. Note that the user data transmitted and/or received by the MME_A 40 serving as a gateway may be small data.

Furthermore, the MME_A 40 may be an NF having a function of the mobility management of the UE_A 10 or the like, or an NF managing one or multiple NSIs. The MME_A 40 may be an NF having one or multiple of these functions. Note that the NF may be one or multiple apparatuses deployed in the core network_A 90, a CP function (hereinafter, also referred to as a Control Plane Function (CPF) or a Control Plane Network Function) for the control information and/or control message, or a common CP function shared between multiple network slices.

Here, the NF is a processing function included in a network. That is, the NF may be a function apparatus such as an MME, an SGW, a PGW, a CPF, an AMF, an SMF, or a UPF, or may be a function such as mobility management (MM) and session management (SM), or capability information. The NF may be a function device to realize a single function, or a function device to realize multiple functions. For example, an NF to realize the MM function and an NF to realize the SM function may be separately present, or an NF to realize both the MM function and the SM function may be present.

The HSS_A 50 is a managing node that is connected to the MME_A 40, the AAA, and the SCEF, and manages subscriber information. The subscriber information of the HSS_A 50 is referred to during the access control performed by the MME_A 40, for example. Furthermore, the HSS_A 50 may be connected to a location management device different from the MME_A 40. For example, the HSS_A 50 may be connected to the CPF_A 140.

Furthermore, the HSS_A 50, a Unified Data Management (UDM)_A 245 may be configured as different apparatuses and/or NFs or the same apparatus and/or NF.

The AAA is connected to the PGW 30, the HSS_A 50, the PCRF, and the WLAN ANa 70 and performs access control for the UE_A 10 connected via the WLAN ANa 70.

The PCRF is connected to the PGW_A 30, the WLAN ANa 75, the AAA, the DN_A 5 and/or the PDN_A 6 and performs QoS management on data delivery. For example, the PCRF manages QoS of a communication path between the UE_A 10, the DN_A 5, and/or the PDN_A 6. Furthermore, the PCRF may be an apparatus to create and/or manage a Policy and Charging Control (PCC) rule and/or a routing rule used by each apparatus for transmitting and/or receiving user data.

In addition, the PCRF may be a PCF to create and/or manage a policy. More specifically, the PCRF may be connected to the UPF_A 235.

The ePDG is connected to the PGW 30 and the WLAN ANb 75 and delivers user data as a gateway between the core network_A 90 and the WLAN ANb 75.

The SGSN is a control apparatus, connected to the UTRAN_A 20, the GERAN, and the SGW_A 35, for performing location management between a 3G/2G access network (UTRAN/GERAN) and the LTE access network (E-UTRAN). In addition, the SGSN has functions of selecting the PGW and the SGW, managing a time zone of the UE_A 10, and selecting the MME_A 40 at the time of handover to the E-UTRAN.

The SCEF is a relay apparatus that is connected to the DN_A 5 and/or the PDN_A 6, the MME_A 40, and the HSS_A 50 and transfers the user data as a gateway for connecting the DN_A 5 and/or the PDN_A 6 with the core network_A 90. Note that the SCEF may serve as a gateway for non-IP communication. Furthermore, the SCEF may have a function to perform conversion between non-IP communication and IP communication. Multiple gateways like this may be deployed in the core network_A 90. Furthermore, multiple gateways connecting the core network_A 90 with a single DN_5 and/or PDN_A 6 and/or DN may be also deployed. Note that the SCEF may be outside or inside the core network.

Next, the core network_B 190 may include at least one of an Authentication Server Function (AUSF), an Access and Mobility Management Function (AMF)_A 240, a Structured Data Storage Network Function (SDSF), an Unstructured data Storage Network Function (UDSF), a Network Exposure Function (NEF), an NF Repository Function (NRF), a Policy Control Function (PCF), a Session Management Function (SMF)_A 230, a Session Management Function (SMF)_B 232, a Unified Data Management (UDM)_A 245, a User Plane Function (UPF)_A 235, a User Plane Function (UPF)_B 237, an Application Function (AF), and a Non-3GPP Interworking Function (N3IWF). Furthermore, these may also be configured as Network Functions (NFs). The NF may be a processing function included in a network. In addition, the core network_B 190 is capable of connecting to multiple radio access networks (the E-UTRAN_A 80, the NG-RAN_A 120, and the WLAN). Such radio access networks may be configured such that multiple different access networks are connected, or any one of the multiple different access networks is connected.

Although only the AMF_A 240, the SMF_A 230, and the UPF_A 235 are illustrated in FIG. 2 among the above elements for simplicity, it does not mean that no other elements (apparatuses and/or NFs) are included therein. Note that the UE_A 10 will also be referred to as UE, the AMF_A 240 as an AMF, the SMF_A 230 as an SMF, the UPF_A 235 as a UPF, and the DN_A 5 and/or the PDN_A 6 as a DN for simplicity.

In addition, FIG. 2 shows an N1 interface (hereinafter, also referred to as a reference point), an N2 interface, an N3 interface, an N4 interface, an N6 interface, an N11 interface, and an N26 interface. Here, the N1 interface is an interface between the UE and the AMF, the N2 interface is an interface between the (R) AN (access network) and the AMF, and the N3 interface is an interface between the (R) AN (access network) and the UPF, the N4 interface is an interface between the SMF and the UPF, the N6 interface is an interface between the UPF and the DN, the N11 interface is an interface between the AMF and the SMF, and the N26 interface is an interface between the AMF of the core network_B 190 and the MME of the core network_A 90. These interfaces can be used to perform communication between the apparatuses. Furthermore, the interfaces linking the apparatuses are indicated by solid lines and dotted lines in FIG. 2. Here, the solid lines indicate interfaces for U-Plane, and the dotted lines indicate interfaces for C-Plane.

Next, a brief description of each apparatus included in the core network_B 190 is given.

First, the AMF_A 240 is connected to another AMF, the SMF_A 230, access networks (i.e., the E-UTRAN_A 80, the NG-RAN_A 120, the WLAN ANc 125, the WLAN ANa 70, and the WLAN ANb 75), the UDM_A 245, the AUSF, and the PCF. The AMF_A 240 may play roles of registration management, connection management, reachability management, mobility management of the UE_A 10 or the like, transfer of a Session Management (SM) message between the UE and the SMF, access authentication or access authorization, a Security Anchor Function (SEA), Security Context Management (SCM), support for the N2 interface for the N3IWF, support for transmission and/or reception of NAS signals to and/or from the UE via the N3IWF, authentication of the UE connected via the N3IWF, management of Registration Management (RM) states, management of Connection Management (CM) states, and the like. In addition, one or more AMF_A 240s may be deployed within the core network_B 190. In addition, the AMF_A 240 may be an NF that manages one or more Network Slice Instances (NSI). In addition, the AMF_A 240 may also be a Common Control Plane Network Function (Common CPNF, or CCNF) shared among multiple NSIs.

In addition, the RM state is, for example, a non-registered state (RM-DEREGISTERED state) or a registered state (RM-REGISTERED state). In the RM-DEREGISTERED state, the UE is not registered in the network, and thus the AMF is not able to reach the UE because the UE context in the AMF does not have valid location information and routing information for the UE. In the RM-REGISTERED state, the UE is registered in the network, and thus the UE can receive services that requires registration with the network.

In addition, the CM state is, for example, a disconnected state (CM-IDLE state) or a connected state (CM-CONNECTED state). In the CM-IDLE state, the UE is in the RM-REGISTERED state but does not have a NAS signaling connection established between the AMF and the UE via the N1 interface. Also, in the CM-IDLE state, the UE does not have an N2 interface connection (N2 connection) and an N3 interface connection (N3 connection). On the other hand, in the CM-CONNECTED state, the UE has the NAS signaling connection established between the AMF and the UE via the N1 interface. Also, in the CM-CONNECTED state, the UE may have the N2 interface connection (N2 connection) and/or the N3 interface connection (N3 connection).

In addition, the SMF_A 230 is connected to the AMF_A 240, the UPF_A 235, the UDM_A 245, and the PCF. The SMF_A 230 may play roles of session management of PDU session, or the like, IP address allocation for the UE, UPF selection and control, UPF configuration for routing traffic to an appropriate destination, a function of reporting arrival of downlink data (Downlink Data Notification), determination of a Session and Service Continuity mode (SSC mode) for a session and an identifier of SM information unique to the AN (for each AN) to be transmitted to the AN via the AMF and the N2 interface, a roaming function, and the like.

In addition, the UPF_A 235 is connected to the DN_A 5, the SMF_A 230, another UPF, and the access networks (i.e. the E-UTRAN_A 80, the NG-RAN_A 120, the WLAN ANc 125, the WLAN ANa 70, and the WLAN ANb 75). The UPF_A 235 may play roles of an anchor to intra-RAT mobility or inter-RAT mobility, packet routing & forwarding, an uplink classifier (UL CL) function to support routing of multiple traffic flows for one DN, a branching point function to support a multi-homed PDU session, QoS processing for a user plane, verification of uplink traffic, buffering of downlink packets, a function of triggering downlink data notification, and the like. Furthermore, the UPF_A 235 may be a relay apparatus that transfers the user data as a gateway between the DN_A 5 and the core network_B 190. Note that the UPF_A 235 may serve as a gateway for IP communication and/or non-IP communication. Furthermore, the UPF_A 235 may have a function of transferring IP communication or a function to perform conversion between non-IP communication and IP communication. The multiple gateways deployed may serve as gateways for connecting the core network_B 190 with a single DN. Note that the UPF_A 235 may have connectivity with another NF or may be connected to each apparatus via another NF.

In addition, the AUSF is connected to the UDM_A 245 and the AMF_A 240. The AUSF functions as an authentication server.

The SDSF provides a function for the NEF to store or retrieve information as structured data.

The UDSF provides a function for all NFs to store or retrieve information as unstructured data.

The NEF provides a means to securely provide services and capabilities provided by the 3GPP network. The NEF stores information received from another NF as structured data.

In a case that a NF discovery request is received from a NF instance, the NRF provides the NF with information of found NF instances or holds information of available NF instances or services supported by the instances.

The PCF is connected to the SMF_A 230, the AF, and the AMF_A 240. The PCF provides a policy rule and the like.

The UDM_A 245 is connected to the AMF_A 240, the SMF_A 230, the AUSF, and the PCF. The UDM_A 245 includes a UDM FE (application front end) and a User Data Repository (UDR). The UDM FE performs processing of authentication information (credentials), location management, subscriber management (subscription management), and the like. The UDR stores data necessary for the UDM FE for provision and the policy profile necessary for the PCF.

The AF is connected to the PCF. The AF affects traffic routing or is involved in the policy control.

The N3IWF provides functions of establishing an IPsec tunnel with the UE, relaying NAS (N1) signaling between the UE and the AMF, processing N2 signaling transmitted from the SMF and relayed by the AMF, establishing IPsec Security Association (IPsec SA), relaying user plane packets between the UE and the UPF, selecting the AMF, and the like.

Next, the IMS_A 7 may include at least one of a Proxy Call Session Control Function (Proxy-CSCF or P-CSCF)_A 300, a P-CSCF_B 310, an Interrogating Call Session Control Function (Interrogating-CSCF or I-CSCF), a Serving Call Session Control Function (Serving-CSCF or S-CSCF)_A 320, and an Emergency Call Session Control Function (Emergency-CSCF or E-CSCF)_A 330. These may be configured as network functions (NFs). The NF may be a processing function included in a network. Here, the Call Session Control Function (CSCF) is a collective name of apparatuses and/or NFs, such as a P-CSCF and/or an S-CSCF and/or an E-CSCF and/or an I-CSCF, that play roles of a server and/or a proxy to process signaling packets of Session Initiation Protocol (SIP) in an IP Multimedia Subsystem (IMS).

Figure 3:
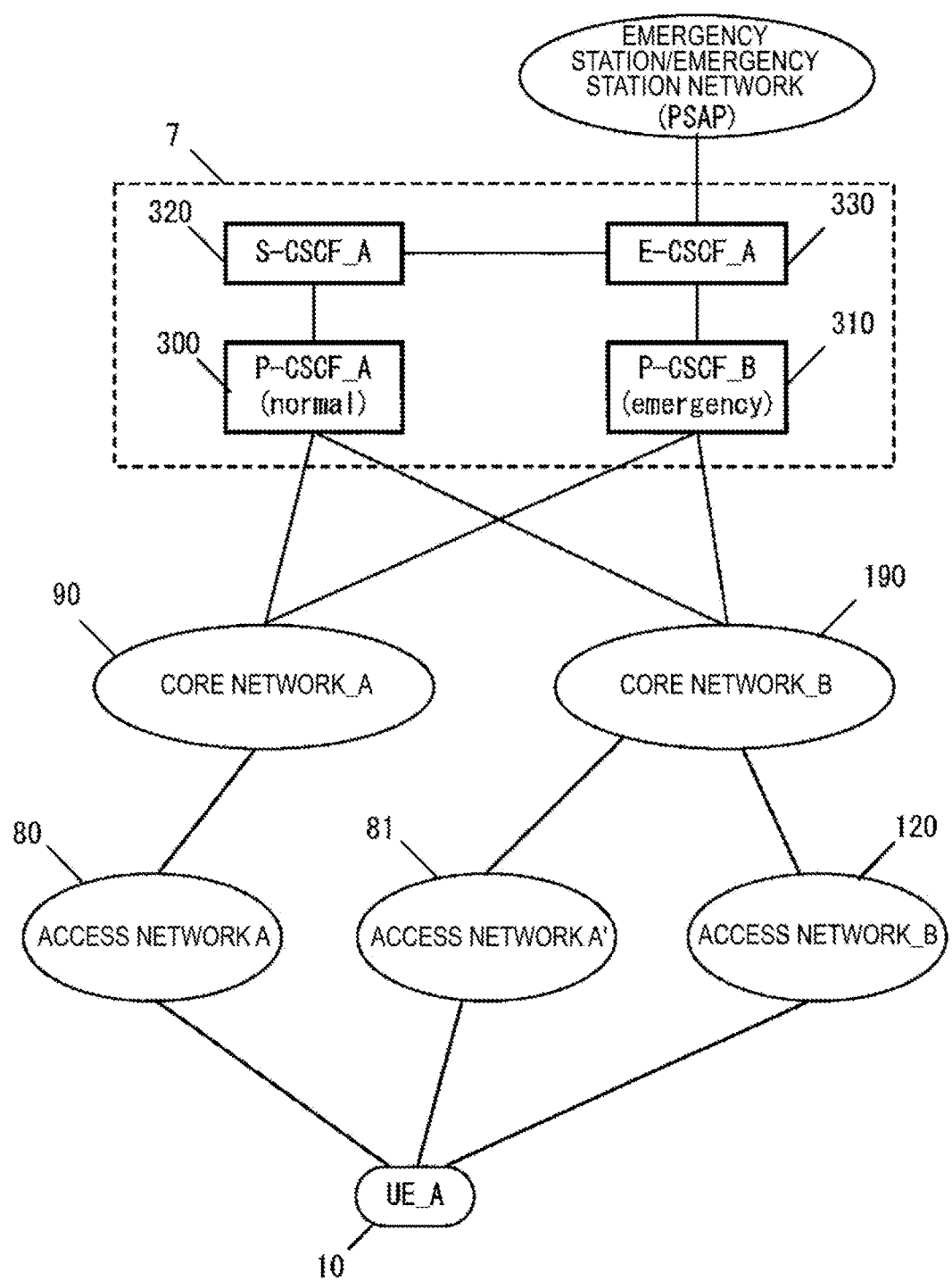
FIG. 3 is a diagram illustrating schematic connection of a normal voice call, an emergency station for an emergency call connection service, an IMS, and core networks.

Although only the P-CSCF_A 300, the P-CSCF_B 310, the S-CSCF_A 320, and E-CSCF_A 330 are described in FIG. 3 for simplicity, it does not mean that no other elements (apparatuses and/or NFs) are included therein. Note that the P-CSCF_A 300 and/or the P-CSCF_B 310 are referred to as a P-CSCF, the S-CSCF_A 320 as a S-CSCF, and the E-CSCF_A 330 as an E-CSCF for simplicity.

In addition, the emergency station/emergency station network (Public Safety Answering Point or PSAP) described in FIG. 3 may be a connection destination and/or a connection destination network of an emergency call connection requested by the UE_A 10.

Next, a brief description of each apparatus included in the IMS_A 7 will be given.

First, the P-CSCF is connected to the core network_A and or the core network_B and/or the UPF and/or the PWG and/or the S-CSCF and/or the E-CSCF, and/or the like. The P-CSCF is an SIP proxy server in a case that the UE_A 10 connects to the IMS_A 7. The P-CSCF is an apparatus of the IMS_A 7 to which the UE_A 10 first connects, and allocated to the UE_A 10 in the registration procedure described below. The UE_A 10 may acquire the destination address of the P-CSCF during the procedure. Furthermore, the P-CSCF may perform processing of the normal call connection and processing of the emergency call connection required by the UE_A 10 with different apparatuses and/or NFs or the same apparatus and/or NF.

In addition, the S-CSCF is also connected to the HSS_A 50 and or the UDM_A 245 and or the P-CSCF and/or the I-CSCF and/or the E-CSCF, and/or the like. The S-CSCF is an SIP server that performs session control and/or user authentication of the IMS for the UE_A 10.

The E-CSCF is connected to the P-CSCF and/or the S-CSCF and/or the I-CSCF and/or the emergency station/emergency station network (PSAP), and/or the like. The E-CSCF is a CSCF for processing an emergency call and may control, for example, routing of an emergency call request to an appropriate emergency station/emergency station network (PSAP).

2. Configuration of Each Apparatus

The configuration of each apparatus will be described below. Note that some or all of apparatuses to be described below and functions of units of the apparatuses may operate on physical hardware, or logical hardware which is virtually configured on general-purpose hardware.

2.1. Configuration of UE

Figure 5:
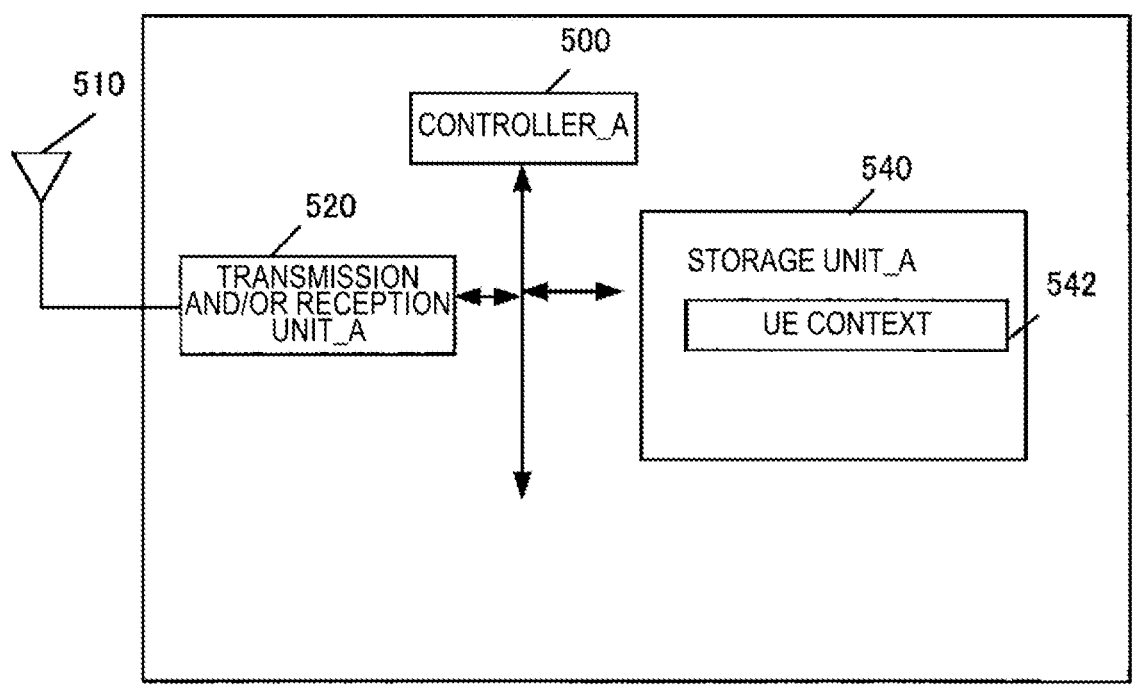
FIG. 5 is a diagram illustrating an apparatus configuration of UE.

First, an example of an apparatus configuration of the UE_A 10 is illustrated in FIG. 5. As illustrated in FIG. 5, the UE_A 10 includes a controller_A 500, a transmission and/or reception unit_A 520, and a storage unit_A 540. The transmission and/or reception unit_A 520 and the storage unit_A 540 are connected to the controller_A 500 via a bus. Furthermore, an external antenna 510 is connected to the transmission and/or reception unit_A 520. Furthermore, the storage unit_A 540 stores a UE context 442.

The controller_A 500 is a function unit for controlling the entire UE_A 10 and implements various processes of the entire UE_A 10 by reading out and performing various types of information and programs stored in the storage unit_A 540.

The transmission and/or reception unit_A 520 is a function unit through which the UE_A 10 connects to the base station (the E-UTRAN_A 80 and the NG-RAN_A 120) and/or the access point (the WLAN ANc 125) in the access network to connect to the access network. In other words, the UE_A 10 can connect to the base station and/or the access point in the access network via the external antenna 510 connected to the transmission and/or reception unit_A 520. To be specific, the UE_A 10 can transmit and/or receive user data and/or control information to and/or from the base station and/or the access point in the access network via the external antenna 510 connected to the transmission and/or reception unit_A 520.

The storage unit_A 540 is a function unit that stores programs, data, and the like necessary for each operation of the UE_A 10, and include, for example, a semiconductor memory, a Hard Disk Drive (HDD), a Solid State Drive (SSD), or the like. The storage unit_A 540 stores identification information, control information, a flag, a parameter, and the like included in a control message which is transmitted and/or received in the communication procedure described below. Examples of the UE context stored in the storage unit_A 540 may include a UE context used to connect to the access networks_B 120 and a UE context used to connect to the core network_B 190. In addition, examples of the UE context 442 may include a UE context stored for each UE, a UE context stored for each PDU session, and a UE context stored for each bearer. The UE context stored for each UE may include an IMSI, an EMM State, a GUTI, and an ME Identity. Furthermore, the UE context stored for each PDU session may include an APN in Use, an assigned session type, IP address(es), and a default bearer. Furthermore, the UE context stored for each bearer may include an EPS bearer ID, a TI, and a TFT.

2.2. Configuration of Access Network Apparatus

Figure 6:
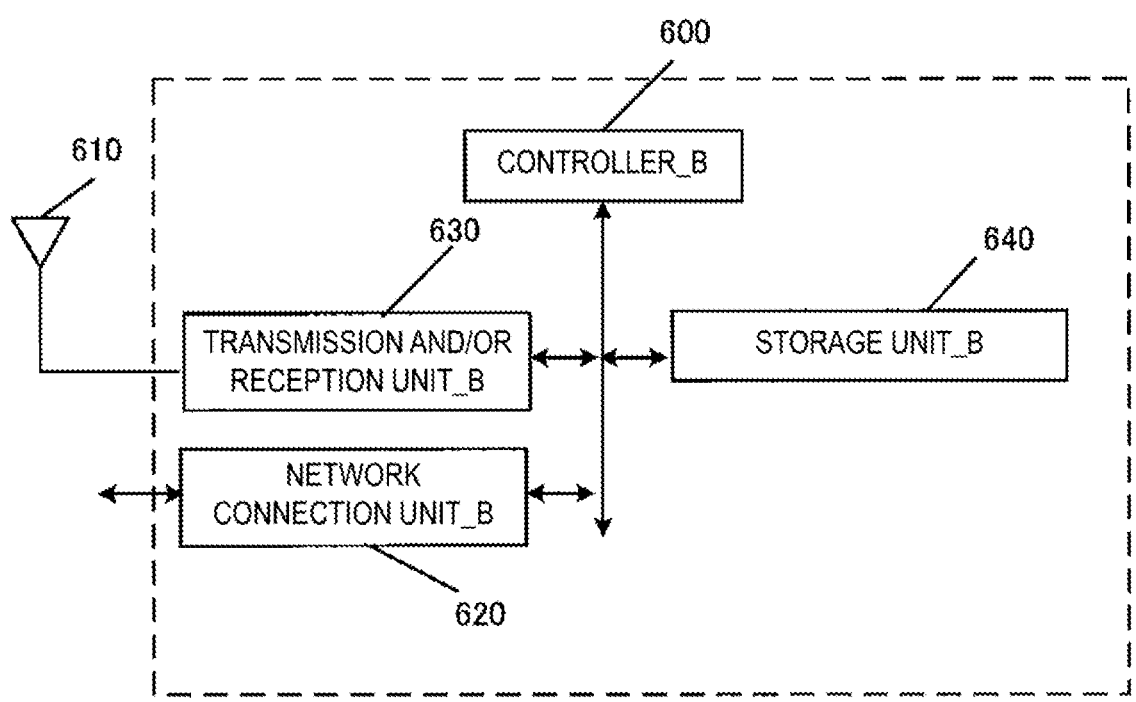
FIG. 6 is a diagram illustrating a configuration of an access network apparatus.

Next, a configuration example of the access network apparatus is illustrated in FIG. 6. The access network apparatus may include, for example, the eNB_A 45 and/or the eNB_B and/or the gNB_A 122 and/or a WAG_A 126, but are not limited to these. As illustrated in FIG. 6, the access network apparatus includes a controller_B 600, a network connection unit_B 620, a transmission and/or reception unit_B 630, and a storage unit_B 640. The network connection unit_B 620, the transmission and/or reception unit_B 630, and the storage unit_B 640 are connected to the controller_B 600 via a bus. Furthermore, an external antenna 610 is connected to the transmission and/or reception unit_B 630.

The controller_B 600 is a function unit for controlling the entirety of the access network apparatus, and implements various processes of the eNB_A 45, the gNB_A 122, and the WAG_A 126 by reading out and performing various types of information and programs stored in the storage unit_B 640.

The network connection unit_B 620 is a function unit through which the access network apparatus connects to the AMF_A 240 and the UPF_A 235 in the core network. In other words, the access network apparatus can be connected to the AMF_A 240 and the UPF_A 235 in the core network via the network connection unit_B 620. Specifically, the access network apparatus can transmit and/or receive user data and/or control information to and/or from AMF_A 240 and/or the UPF_A 235 via the network connection unit_B 620.

The transmission and/or reception unit_B 630 is a function unit for the access network apparatus to connect to the UE_A 10. In other words, the access network apparatus can transmit and/or receive user data and/or control information to and/or from the UE_A 10 via the transmission and/or reception unit_B 630.

The storage unit_B 640 is a function unit configured to store programs, data, and the like necessary for operations of the access network apparatus. The storage unit_B 640 includes, for example, a semiconductor memory, an HDD, an SSD, or the like. The storage unit_B 640 stores identification information, control information, a flag, a parameter, and the like included in a control message which is transmitted and/or received in the communication procedure described below. The storage unit_B 640 may store these pieces of information as the contexts for each UE_A 10.

2.3. Configuration of MME/AMF

Figure 7:
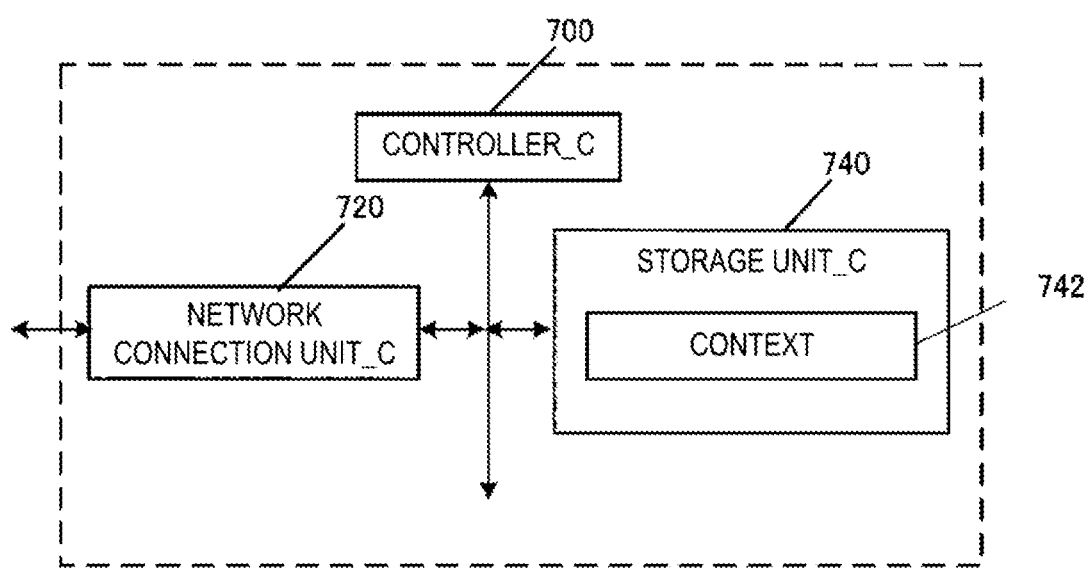
FIG. 7 is a diagram illustrating an apparatus configuration of an MME/AMF.

Next, FIG. 7 illustrates an example of an apparatus configuration of the MME_A 40 and/or the AMF_A 240. As illustrated in FIG. 7, the MME_A 40 and/or the AMF_A 240 include a controller_C 700, a network connection unit_C 720, and a storage unit_C 740. The network connection unit_C 720 and the storage unit_C 740 are connected to the controller_C 700 via a bus. Furthermore, the storage unit_C 740 stores a context 742.

The controller_C 700 is a function unit for controlling all of the MME_A 40 and/or the AMF_A 240, and implements various processes of all of the MME_A 40 and/or the AMF_A 240 by reading out and performing various types of information and programs stored in the storage unit_C 740.

The network connection unit_C 720 is a function unit through which the MME_A 40 and/or the AMF_A 240 connect to another AMF_240, SMF_A 230, a base station (the E-UTRAN_A 80 and the NG-RAN_A 120) and/or an access point (the WLAN ANc 125), the UDM_A 245, the AUSF, and the PCF in the access network. In other words, the MME_A 40 and/or the AMF_A 240 can transmit and/or receive user data and/or control information to and/or from the base station and/or access point, the UDM_A 245, the AUSF, and the PCF in the access network via the network connection unit_C 720.

The storage unit_C 740 is a function unit for storing programs, data, and the like necessary for each operation of the MME_A 40 and/or the AMF_A 240. The storage unit_C 740 includes, for example, a semiconductor memory, an HDD, an SSD, or the like. The storage unit_C 740 stores identification information, control information, a flag, a parameter, and the like included in a control message which is transmitted and/or received in the communication procedure described below. Examples of the context 742 stored in the storage unit_C 740 may include a context stored for each UE, a context stored for each PDU session, and a context stored for each bearer. The context stored for each UE may include an IMSI, an MSISDN, MM State, a GUTI, a ME Identity, a UE radio access capability, a UE network capability, an MS network capability, an access restriction, an MME F-TEID, an SGW F-TEID, an eNB address, an MME UE S1AP ID, an eNB UE S1AP ID, a gNB address, a gNB ID, a WAG address, and a WAG ID. Furthermore, the context stored for each PDU session may include an APN in Use, an assigned session type, IP address(es), a PGW F-TEID, an SCEF ID, and a default bearer. Furthermore, the context stored for each bearer may include an EPS bearer ID, a TI, a TFT, an SGW F-TEID, a PGW F-TEID, an MME F-TEID, an eNB address, a gNB address, a WAG address, an eNB ID, a gNB ID, and a WAG ID.

2.4. Configuration of SMF

Figure 8:
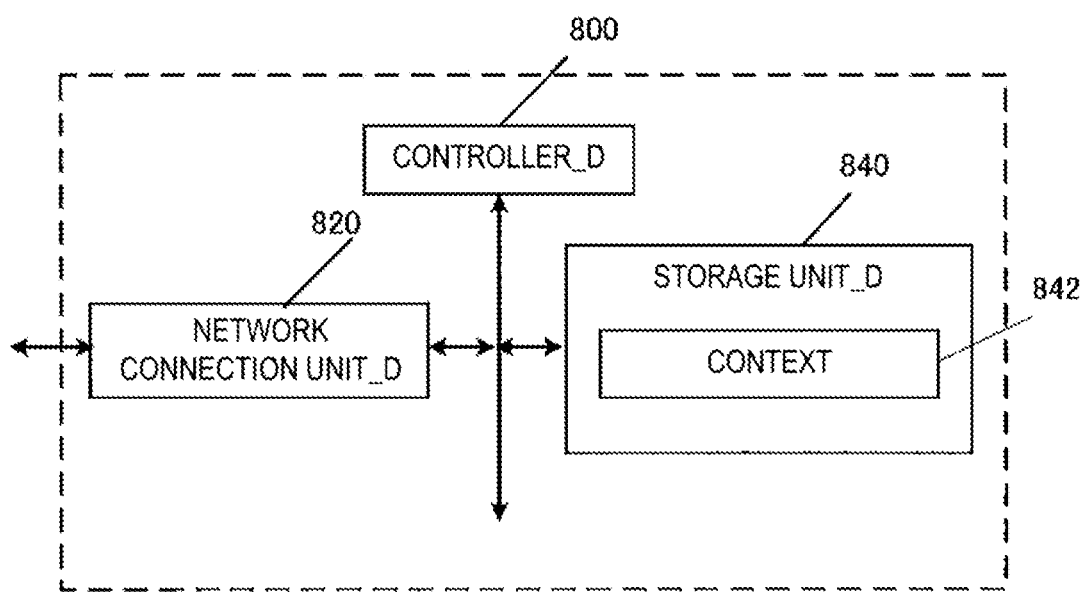
FIG. 8 is a diagram illustrating an apparatus configuration of an SMF/PGW/UPF.

Next, FIG. 8 illustrates an example of an apparatus configuration of the SMF_A 230. As illustrated in FIG. 8, the SMF_A 230 includes a controller_D 800, a network connection unit_D 820, and a storage unit_D 840. The network connection unit_D 820 and the storage unit_D 840 are connected to the controller_D 800 via a bus. In addition, the storage unit_D 840 stores a context 842.

The controller_D 800 of the SMF_A 230 is a function unit for controlling the entire SMF_A 230 and implements various processes of the entire SMF_A 230 by reading out and performing various types of information and programs stored in the storage unit_D 840.

Furthermore, the network connection unit_D 820 of the SMF_A 230 is a function unit through which the SMF_A 230 connects to the AMF_A 240, the UPF_A 235, the UDM_A 245, and the PCF. In other words, the SMF_A 230 can transmit and/or receive user data and/or control information to and/or from the AMF_A 240, the UPF_A 235, the UDM_A 245, and the PCF via the network connection unit_D 820.

Furthermore, the storage unit_D 840 of the SMF_A 230 is a function unit for storing programs, data, and the like necessary for each operation of the SMF_A 230. The storage unit_D 840 of the SMF_A 230 includes, for example, a semiconductor memory, an HDD, an SSD, or the like. The storage unit_D 840 of the SMF_A 230 stores identification information, control information, a flag, a parameter, and the like included in a control message which is transmitted and/or received in the communication procedure described below. In addition, examples of the context 842 stored in the storage unit_D 840 of the SMF_A 230 may include a context stored for each UE, a context stored for each APN, a context stored for each PDU session, and a context stored for each bearer. The context stored for each UE may include an IMSI, an ME Identity, an MSISDN, and a RAT type. The context stored for each APN may include an APN in use. Note that the context stored for each APN may be stored for each data network identifier. The context stored for each PDU session may include an assigned session type, IP address (es), an SGW F-TEID, a PGW F-TEID, and a default bearer. The context stored for each bearer may include an EPS bearer ID, a TFT, an SGW F-TEID, and a PGW F-TEID.

2.5. Configuration of PGW/UPF

Next, FIG. 8 illustrates an example of an apparatus configuration of the PGW_A 30 and/or the UPF_A 235. As illustrated in FIG. 8, each of the PGW_A 30 and/or the UPF_A 235 includes a controller_D 800, a network connection unit_D 820, and a storage unit_D 840. The network connection unit_D 820 and the storage unit_D 840 are connected to the controller_D 800 via a bus. In addition, the storage unit_D 840 stores a context 842.

The controller_D 800 of the PGW_A 30 and/or the UPF_A 235 is a function unit for controlling the entire UPF_A 235, and implements various processes of all of the PGW_A 30 and/or the UPF_A 235 by reading out and performing various types of information and programs stored in the storage unit_D 840.

Furthermore, the network connection unit_D 820 of the PGW_A 30 and/or the UPF_A 235 is a function unit through which the PGW_A 30 and/or the UPF_A 235 connect to a DN (i.e. the DN_A 5 and/or the PDN_A 6), the SMF_A 230, another PGW_A 30 and/or the UPF_A 235, and an access network (i.e. the E-UTRAN_A 80, the NG-RAN_A 120, the WLAN ANc 125, the WLAN ANa 70, and the WLAN ANb 75). In other words, the UPF_A 235 can transmit and/or receive user data and/or control information to and/or from the DN (i.e., the DN_A 5 and/or the PDN_A 6), the SMF_A 230, the other UPF_A 235, and the access network (i.e. the E-UTRAN_A 80, the NG-RAN_A 120, the WLAN ANc 125, the WLAN ANa 70, and the WLAN ANb 75) via the network connection unit_D 820.

Furthermore, the storage unit_D 840 of the PGW_A 30 and/or the UPF_A 235 is a function unit for storing programs, data, and the like necessary for each operation of the PGW_A 30 and/or the UPF_A 235. The storage unit_D 840 of the PGW_A 30 and/or the UPF_A 235 includes, for example, a semiconductor memory, an HDD, an SSD, or the like. The storage unit_D 840 of the PGW_A 30 and/or the UPF_A 235 stores identification information, control information, a flag, a parameter, and the like included in a control message which is transmitted and/or received in the communication procedure described below. In addition, examples of the context 842 stored in the storage unit_D 840 of the PGW_A 30 and/or the UPF_A 235 may include a context stored for each UE, a context stored for each APN, a context stored for each PDU session, and a context stored for each bearer. The context stored for each UE may include an IMSI, an ME Identity, an MSISDN, and a RAT type. The context stored for each APN may include an APN in use. Note that the context stored for each APN may be stored for each data network identifier. The context stored for each PDU session may include an assigned session type, IP address (es), an SGW F-TEID, a PGW F-TEID, and a default bearer. The context stored for each bearer may include an EPS bearer ID, a TFT, an SGW F-TEID, and a PGW F-TEID.

2.6. Configuration of CSCF

Figure 9:
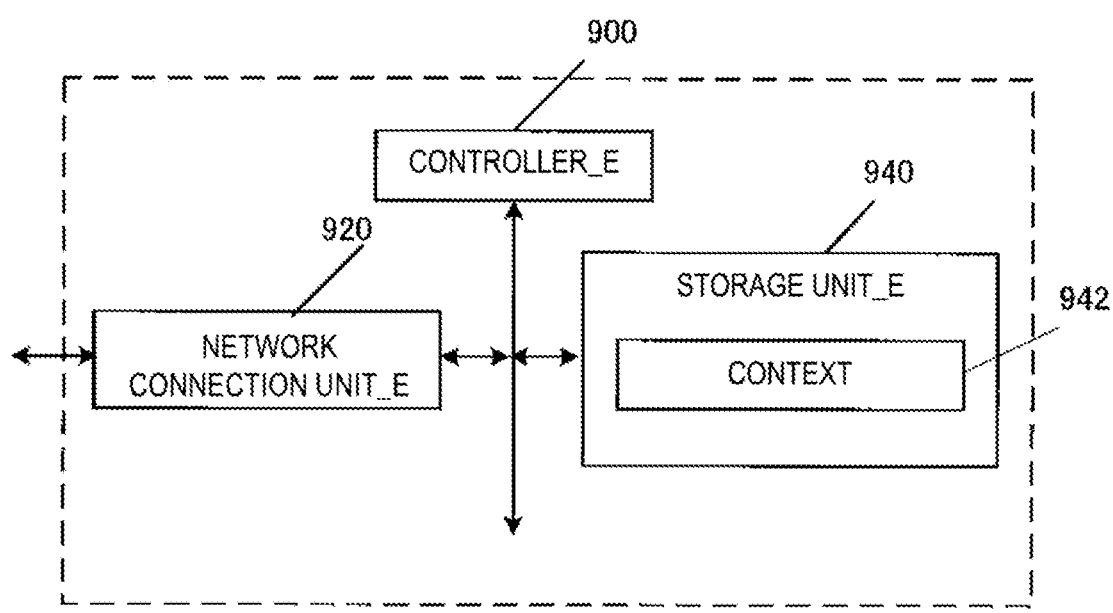
FIG. 9 is a diagram illustrating an apparatus configuration of a CSCF.

Next, FIG. 9 illustrates an example of a configuration of the CSCF. As illustrated in FIG. 9, the CSCF includes a controller_E 900, a network connection unit_E 920, and a storage unit_E 940. The network connection unit_E 920 and the storage unit_E 940 are connected to the controller_E 900 via a bus. In addition, the storage unit_E 940 stores a context 942.

The controller_E 900 of the CSCF is a function unit for controlling the entire CSCF and implements various processes of the entire CSCF by reading out and performing various types of information and programs stored in the storage unit_E 940.

Furthermore, the network connection unit_E 920 of the CSCF is a function unit through which the CSCF connects to another CSCF, the UPF_A 235, the PGW_A 30, the HSS_A 50, and the UDM_A 245. In other words, the CSCF can transmit and/or receive user data and/or control information to and/or from the other CSCF, the UPF_A 235, the PGW_A 30, the HSS_A 50, and the UDM_A 245 via the network connection unit_E 920.

In addition, the storage unit_E 940 of the CSCF is a function unit for storing programs, data, and the like necessary for each operation of the CSCF. The storage unit_E 940 includes, for example, a semiconductor memory, an HDD, an SSD, or the like. The storage unit_E 940 stores identification information, control information, a flag, a parameter, and the like included in a control message which is transmitted and/or received in the communication procedure described below. The context 942 stored in the storage unit_E 940 may include a context stored for each UE, an IMSI, an MSISDN, a UE address, public user ID(s), private user ID(s), an access network type, and a session status (session state information).

2.7. Information Stored in Storage Unit of Each Apparatus

Next, each piece of information stored in the storage unit of each of the above-described apparatuses will be described.

The International Mobile Subscriber Identity (IMSI) and/or the Subscriber Permanent identifier (SUPI) are permanent identification information of a subscriber (user) and is identification information assigned to a user using the UE. The IMSI and/or the SUPI stored by the UE_A 10, the MME_A 40/CPF_A 140/AMF_A 2400, and the SGW_A 35 may be the same as the IMSI and/or the SUPI stored by the HSS_A 50 and/or the UDM_A 245. Here, the SUPI may include the IMSI.

The EMM State/MM State indicates a mobility management state of the UE_A 10 or the MME_A 40/CPF_A 140/AMF_A 240. For example, the EMM State/MM State may be an EMM-REGISTERED state (registered state) in which the UE_A 10 is registered in the network, and/or an EMM-DEREGISTERD state (deregistered state) in which the UE_A 10 is not registered in the network. The EMM State/MM State may be an ECM-CONNECTED state in which a connection is maintained between the UE_A 10 and the core network, and/or an ECM-IDLE state in which the connection is released. Note that the EMM State/MM State may be information for distinguishing a state in which the UE_A 10 is registered in the EPC from a state in which the UE_A 10 is registered in the NGC or 5GC.

The Globally Unique Temporary Identity (GUTI) is temporary identification information of the UE_A 10. The GUTI includes identification information (Globally Unique MME Identifier (GUMMEI)) of the MME_A 40/CPF_A 140/AMF_A 240 and identification information (M-Temporary Mobile Subscriber Identity (M-TMSI)) of the UE_A 10 in a specific MME_A 40/CPF_A 140/AMF_A 240. The ME Identity is an ID of the UE_A 10 or the ME, and may be International Mobile Equipment Identity (IMEI) or IMEI Software Version (IMEISV), for example. The MSISDN represents a basic phone number of the UE_A 10. The MSISDN stored by the MME_A 40/CPF_A 140/AMF_A 240 may be information indicated by the storage unit of the HSS_A 50. Note that the GUTI may include information for identifying the CPF_140.

The MME F-TEID is information for identifying the MME_A 40/CPF_A 140/AMF_A 240. The MME F-TEID may include an IP address of the MME_A 40/CPF_A 140/AMF_A 240, a Tunnel Endpoint Identifier (TEID) of the MME_A 40/CPF_A 140/AMF_A 240, or both of them. Furthermore, the IP address of the MME_A 40/CPF_A 140/AMF_A 240 and the TEID of the MME_A 40/CPF_A 140/AMF_A 240 may be stored independently of each other. The MME F-TEID may be identification information for user data, or identification information for control information.

The SGW F-TEID is information for identifying the SGW_A 35. The SGW F-TEID may include an IP address of the SGW_A 35, a TEID of the SGW_A 35, or both of them. The IP address of the SGW_A 35 and the TEID of the SGW_A 35 may be stored independently of each other. The SGW F-TEID may be identification information for user data, or identification information for control information.

The PGW F-TEID is information for identifying the PGW_A 30/UPGW_A 130/SMF_A 230/UPF_A 235. The PGW F-TEID may include an IP address of the PGW_A 30/UPGW_A 130/SMF_A 230/UPF_A 235, a TEID of the PGW_A 30/UPGW_A 130/SMF_A 230/UPF_A 235, or both of them. In addition, the IP address of the PGW_A 30/UPGW_A 130/SMF_A 230/UPF_A 235 and the TEID of the PGW_A 30/UPGW_A 130/SMF_A 230/UPF_A 235 may be stored independently of each other. The PGW F-TEID may be identification information for user data, or identification information for control information.

The eNB F-TEID is information for identifying the eNB_A 45. The eNB F-TEID may include an IP address of the eNB_A 45, a TEID of the eNB_A 45, or both of them. The IP address of the eNB_A 45 and the TEID of the SGW_A 35 may be stored independently of each other. The eNB F-TEID may be identification information for user data, or identification information for control information.

The APN may be identification information for identifying the core network and an external network such as the DN. Furthermore, the APN can also be used as information for selecting a gateway such as the PGW_A 30/UPGW_A 130/UPF_A 235 for connecting the core network A_90. Note that the APN may be a Data Network Name (DNN). Therefore, the APN may be represented by a DNN, or the DNN may be represented by the APN.

Note that the APN may be identification information for identifying such a gateway, or identification information for identifying an external network such as the DN. Note that, in a case that multiple gateways connecting the core network and the DN are deployed, there may be multiple gateways that can be selected according to the APN. Furthermore, one gateway may be selected among such multiple gateways by another method using identification information other than the APN.

The UE Radio Access Capability is identification information indicating a radio access capability of the UE_A 10. The UE Network Capability includes an algorithm of security supported by the UE_A 10 and a key derivation function. The MS Network Capability is information including one or more pieces of information necessary for the SGSN with respect to the UE_A 10 having a function of the GERAN_A 25 and/or the UTRAN_A 20. The Access Restriction is registration information for access restriction. The eNB_Address is an IP address of the eNB_A 45. The MME UE S1AP ID is information for identifying the UE_A 10 in the MME_A 40/CPF_A 140/AMF_A 240. The eNB UE S1AP ID is information for identifying the UE_A 10 in the eNB_A 45.

The APN in Use is an APN recently used. The APN in Use may be Data Network Identifier. This APN may include identification information of the network and identification information of a default operator. Furthermore, the APN in Use may be information for identifying a DN with which the PDU session is established.

The Assigned Session Type is information indicating a PDU session type. The Assigned Session Type may be Assigned PDN Type. The PDU session type may be IP, or non-IP. Furthermore, in a case that the PDU session type is IP, information indicating a PDN type assigned by the network may be further included. Note that the Assigned Session Type may be IPv4, IPv6, or IPv4v6.

Unless otherwise specifically described, the IP Address refers to the IP address assigned to the UE. The IP address may be an IPv4 address, an IPv6 address, or an IPv6 prefix. Note that in a case that the Assigned Session Type indicates non-IP, an element of the IP Address may not be included.

The DN ID is identification information for identifying the core network_B 190 and an external network such as the DN. Furthermore, the DN ID can also be used as information for selecting a gateway such as the UPGW_A 130 or the PF_A 235 connecting the core network_B 190.

Note that the DN ID may be identification information for identifying such a gateway, or identification information for identifying an external network such as the DN. Note that, in a case that multiple gateways connecting the core network_B 190 and the DN are deployed, there may be multiple gateways that can be selected according to the DN ID.

Furthermore, one gateway may be selected among such multiple gateways by another method using identification information other than the DN ID.

Furthermore, the DN ID may be information equivalent to the APN, or different from the APN. Note that in a case that the DN ID is the information different from the APN, each apparatus may manage information indicating correspondence between the DN ID and the APN, perform a procedure to inquire the APN by using the DN ID, or perform a procedure to inquire the DN ID by using the APN.

The SCEF ID is an IP address of the SCEF used in the PDU session. The Default Bearer is information acquired and/or created in a case that a PDU session is established and is EPS bearer identification information for identifying a default bearer associated with the PDU session.

The EPS Bearer ID is identification information of the EPS bearer. The EPS Bearer ID may be identification information for identifying Signalling Radio Bearer (SRB) and/or Control-plane Radio bearer (CRB), or identification information for identifying Data Radio Bearer (DRB). The Transaction Identifier (TI) is identification information for identifying a bidirectional message flow (Transaction). Note that the EPS Bearer ID may be EPS bearer identification information for identifying a dedicated bearer. Therefore, the EPS bearer ID may be identification information for identifying the EPS bearer different from the default bearer. The TFT indicates all packet filters associated with the EPS bearer. The TFT is information for identifying some pieces of user data to be transmitted and/or received, and thus, the UE_A 10 uses the EPS bearer associated with the TFT to transmit and/or receive the user data identified by the TFT. In still other words, the UE_A 10 uses a Radio Bearer (RB) associated with the TFT to transmit and/or receive the user data identified by the TFT. The TFT may associate the user data such as application data to be transmitted and/or received with an appropriate transfer path, and may be identification information for identifying the application data. The UE_A 10 may use the default bearer to transmit and/or receive the user data which cannot be identified by the TFT. The UE_A 10 may store in advance the TFT associated with the default bearer.

The Default Bearer is EPS bearer identification information for identifying a default bearer associated with PDN connection/PDU session. Note that the EPS bearer may be a logical communication path established between the UE_A 10 and the PGW_A 30/UPGW_A 130/UPF_A 235, or a communication path constituting the PDN connection/PDU session. Furthermore, the EPS bearer may be a default bearer, or a dedicated bearer. Furthermore, the EPS bearer may include an RB established between the UE_A 10 and the base station and/or the access point in the access network. Furthermore, the RB and the EPS bearer may be associated with each other on a one-to-one basis. Therefore, identification information of the RB may be associated with the identification information of the EPS bearer on a one-to-one basis, or may be the same identification information as the identification information of the EPS bearer. Note that the RB may be an SRB and/or a CRB, or a DRB. Furthermore, the Default Bearer may be information that the UE_A 10 and/or the SGW_A 35 and/or the PGW_A 30/UPGW_A 130/SMF_A 230/UPF_A 235 acquire from the core network in a case that the PDU session is established. Note that the default bearer is an EPS bearer first established during the PDN connection/PDU session, and is such an EPS bearer that only one bearer can be established during one PDN connection/PDU session. The default bearer may be an EPS bearer that can be used for communication of user data not associated with the TFT. The dedicated bearer is an EPS bearer established after the default bearer is established during the PDN connection/PDU session, and is such an EPS bearer that multiple bearers can be established during one PDN connection/PDU session. The dedicated bearer is an EPS bearer that can be used for communication of user data not associated with the TFT.

User Identity is information for identifying a subscriber. The User Identity may be an IMSI, or an MSISDN. Furthermore, the User Identity may also be identification information other than the IMSI or the MSISDN. Serving Node Information is information for identifying the MME_A 40/CPF_A 140/AMF_A 240 used in a PDU session, and may be an IP address of the MME_A 40/CPF_A 140/AMF_A 240.

The eNB Address is an IP address of the eNB_A 45. The eNB ID is information for identifying the UE in the eNB_A 45. MME Address is an IP address of the MME_A 40/CPF_A 140/AMF_A 240. MME ID is information for identifying the MME_A 40/CPF_A 140/AMF_A 240. The gNB Address is an IP address of the gNB_A 122. The gNB ID is information for identifying the gNB_A 122. The WAG Address is an IP address of the WAG_A 126. The WAG ID is information for identifying the WAG_A 126.

3. Description of Various Procedures and Terms and Pieces of Identification Information According to Each Embodiment Next, before detailed steps of various procedures according to each of the present embodiments are described, specific terminology and primary identification information used in each procedure according to the present embodiment will be described beforehand in order to avoid overlapping descriptions. In the following, various procedures according to each embodiment are also referred to as the present procedure.

First, a first state is a state in which network capability information of a network (access network and/or core network) is acquired and/or held by UE_A 10.

Here, the network capability information acquired and/or stored by the UE_A 10 may be based on the identification information included in a message transmitted as broadcast information from the access network and/or an apparatus configuring the access network, may be based on the identification information included in a message received between the UE_A and the access network and/or the apparatus configuring the access network in an RRC procedure, may be based on the identification information included in a message transmitted and/or received between the UE_A and the core network in a registration procedure with the core network, or may be based on a combination of any of two or more of these.

Note that the network capability information that is notified to the UE_A 10 in the first state from the access network and/or the core network (hereinafter also referred to as a network) to be acquired and/or stored may be information indicating support of the voice service and/or support of the emergency call service by the network and/or whether or not a function for enabling handover and/or redirection to a network optimal for the emergency call service is supported, or may be information of a combination of any of two or more of these.

Furthermore, the first state may be a state in which the UE_A 10 acquires and holds the capability information of the network with which the registration procedure is not performed during the registration procedure. Here, the network with which the registration procedure is not performed may be another core network in the same PLMN.

In other words, the first state may be a state in which the UE_A 10 requests, acquires, and holds the capability information of the core network_B 190 in the registration procedure with respect to the core network_A 90 or may be a state in which the UE_A 10 requests, acquires, and holds the capability information of the core network_A in the registration procedure with respect to the core network_B 190. Here, the capability information of the network may include information related to support of the voice call service function and/or bearer support dedicated to emergency calls.

Furthermore, S1 mode is a UE mode in which transmission and/or reception of a message using the S1 interface is enabled. Note that the S1 interface may include the S1-MME interface and the S1-U interface and the X2 interface connecting the radio base stations.

The UE in the S1 mode is, for example, capable of access to the EPC via the eNB providing the E-UTRA function and access to the EPC via the en-gNB providing the NR function.

Note that although the access to the EPC via the eNB providing the E-UTRA function and the access to the EPC via the en-gNB providing the NR function are defined as the S1 mode, those accesses may be configured as individual modes different from each other.

Furthermore, N1 mode is a UE mode in which the UE is capable of access to the 5GC via the 5G access network. Furthermore, the N1 mode may be a UE mode in which transmission and/or reception of a message using the N1 interface is enabled. Note that the N1 interface may include the N1 interface and the Xn interface connecting the radio base stations.

The UE in the N1 mode is, for example, capable of access to the 5GC via the ng-eNB providing the E-UTRA function and access to the 5GC via the gNB providing the NR function.

Note that although the access to the 5GC via the ng-eNB providing the E-UTRA function and the access to the 5GC via the gNB providing the NR function are defined as the N1 mode, those accesses may be configured as individual modes different from each other.

Next, the identification information in the present embodiment will be described.

First, the 1st identification information according to the present embodiment may be information for the UE_A 10 to inquire whether or not the voice service and/or the emergency call service via the core network_B 190 with which the UE_A 10 attempts to register (including a bearer for an emergency call or PDU session function support) is supported.

The first identification information may be information indicating a Preference (Prf) such that the UE_A 10 prioritizes the support of the voice service function and/or an emergency call bearer or a PDU session function by the core network_B 190 with which the UE_A 10 attempts to register.

Furthermore, the core network_B 190 that has received a request message including the first identification information from the UE_A 10 may inquire of another core network in the same PLMN network capability information including the support of the voice service and/or an emergency call service, or the AMF_A 240 in the core network_B 190 may hold or configure the network capability information in advance.

Note that, in a case that the first identification information is transmitted in the registration procedure, the first identification information included in a registration request is preferably transmitted; however, the first identification information may be transmitted in any control message (e.g., a NAS message) other than the registration request. Furthermore, in a case that the first identification information is transmitted in the PDU session establishment procedure, the first identification information included in a PDU session establishment request is preferably transmitted; however, the first identification information may be transmitted in any control message (e.g., a NAS message) other than the PDU session establishment request. In addition, the first identification information may be transmitted in any control message (e.g., a NAS message; (Periodic) Registration Update) at any timing after the registration procedure and/or PDU session establishment procedure are completed.

In addition, 10th identification information is capability information indicating whether the access network_B and/or the core network_B 190 supports the voice service function.

The 10th identification information may be information indicating whether or not the connected access network and access network different from the core network and/or the core network supports the voice call service.

For example, the 10th identification information may indicate presence or absence of support of the voice call service via an access network A' connected to the core network_B 190, or may indicate presence or absence of support of the voice call service via the core network A present in the same PLMN as the core network_B 190.

The 10th identification information may be information indicating, in a case that the connected access network and core network do not support the voice call service, whether or not the access network supports the function of performing handover and/or redirection via another access network in the same PLMN.

For example, the 10th identification information may be information indicating, in a case that the connected access network B and core network_B 190 do not support the voice call service, whether or not the access network B supports the function of performing handover and/or redirection via the access network A' supporting the voice call service or the access network A, based on the PDU session establishment request made by the UE_A 10.

The UE_A 10 may perform subsequent processing of the emergency call connection, based on reception of the 11th identification information.

Note that the 10th identification information may be, for example, information related to IMS voice support (IMS voice over PS session indicator; IMS VoPS) in a PS session in an information element (5GS network feature support IE) related to 5GS network function support included in a registration accept (REGISTRATION ACCEPT) message in the registration procedure with a network.

Next, 11th identification information according to the present embodiment is capability information indicating whether the access network_B and/or the core network_B 190 supports the emergency call service. In other words, the 11th identification information is information indicating presence or absence of support of the emergency call service for each path of the emergency call connection or for each access network via the core network B.

For example, the 11th identification information may be information indicating presence or absence of the emergency call service support via the access network B and the core network_B 190, may be information indicating presence or absence of the emergency call service support via the access A' and the core network_B 190, may be information indicating presence or absence of the emergency call service support in both of the access network B and the access network A' connected to the core network_B 190, or may be information indicating presence or absence of support of the emergency call service via the core network_B 190 regardless of the access network.

The 11th identification information may be information indicating, in a case that the connected access network and core network do not support the emergency call service, whether or not the access network supports the function of performing the handover and/or redirection of an emergency call connection request from the UE_A 10 via another access network in the same PLMN.

For example, the 11th identification information may be information indicating, in a case that the connected access network B and core network_B 190 do not support the emergency call service, whether or not the access network B supports the function of performing the handover and/or redirection of the emergency call connection request from the UE_A 10 via the access network A'.

The UE_A 10 may perform subsequent processing of the emergency call connection, based on reception of the 11th identification information.

Note that the 11th identification information may be, for example, information related to support of the emergency call service (Emergency service support indicator; EMC) in an information element (5GS network feature support IE) related to the 5GS network function support included in a registration accept (REGISTRATION ACCEPT) message in the registration procedure with a network.

Next, the 12th identification information according to the present embodiment may be, in a case that the connected access network and core network do not support the voice service and/or the emergency call service, information indicating whether the voice service and/or the emergency call service via another core network in the same PLMN as the connected core network is supported, or may be information indicating whether the voice service and/or the emergency call service via another access network connected to the core network B is supported.

For example, the 12th identification information may be information indicating whether the voice service and/or the emergency call service via the core network_A 90 being another core network in the same PLMN as the connected core network_B 190 is supported, or may be information indicating whether the voice service and/or the emergency call service via the access network A' being another access network connected to the core network_B 190 is supported.

The UE_A 10 may perform subsequent processing of the emergency call connection, based on reception of the 12th identification information.

In other words, in a case that the emergency call service via the connected core network with the 11th identification information is enabled, the UE_A 10 need not perform processing based on the 12th identification information in subsequent emergency call connection processing.

In addition to this, the 12th identification information may be information indicating a detailed scheme of an emergency call procedure performed by the UE_A 10 by combining with the 11th identification information. In this case, even in a case that the emergency call service via the connected core network in the 11th identification information is enabled, the UE_A 10 may perform subsequent emergency call connection processing, based on the 12th identification information.

Specifically, support indicated by the 12th identification information in this case may be information indicating that the access network supports the handover and/or redirection function started by the core network, based on a service request (SERVICE REQUEST) including the 30th identification information, or may be information indicating that the core network performs SERVICE REQUEST including the 30th identification information for the UE_A 10. Here, non-support indicated by the 12th identification information may be information indicating that the access network does not support SERVICE REQUEST including the 30th identification information by the UE_A 10.

Note that the 11th identification information may be, for example, information related to fallback of the emergency call service (Emergency service fallback indicator; EMF) in an information element (5GS network feature support IE) related to the 5GS network function support included in a registration accept (REGISTRATION ACCEPT) message in the registration procedure with a network, and may indicate presence or absence of support of the emergency call fallback.

Next, the 30th identification information according to the present embodiment may be information indicating that handover and/or redirection to the access network and/or the core network other than the connected access network and/or core network is requested in the emergency call connection.

Next, the 40th identification information according to the present embodiment may be information indicating that the 30th identification information indicating that the handover and/or redirection to the access network and/or the core network other than the connected access network and/or core network is requested in the emergency call connection has been rejected, or may be a cause value indicating rejection.

Furthermore, in addition to this, the 40th identification information may be information indicating an access domain and/or a domain in which emergency call reconnection by the UE_A 10 after the rejection reception is enabled.

For example, the 30th identification information received via the access network B and the core network_B 190 may be rejected. In this case, in addition to the rejection, the 40th identification information may indicate whether the emergency call service via the access network A' or the core network A connected to the core network_B 190 is supported.

More specifically, the 40th identification information may be information indicating a CS domain, may be information indicating the core network_A and/or the access network_A being the same PLMN as the core network_B 190, may be information indicating the core network_B 190 and/or the access network A', or may be information indicating the core network_B 190 and/or the access network B.

Next, various procedures according to the present embodiment will be described with reference to FIG. 10. In the following, various procedures according to each embodiment are also referred to as the present procedure, and the present procedure includes reception of the broadcast information (S1000) and/or an RRC procedure (S1010), a Registration procedure with the core network (S1020), determination of emergency call connection execution by the UE (S1040), a service request procedure for the emergency call (S1050) and a first procedure (S1060), and/or access network selection by the UE (S1065), a second procedure (S1070), and an IMS procedure for the emergency call (S1080).

Here, the procedure of (A) in the present procedure may include the procedure of (B) in the present procedure and/or the procedure of (C) in the present procedure. The procedure of (B) in the present procedure is the reception of the broadcast information, and the procedure of (C) in the present procedure may be the RRC procedure. Furthermore, the procedure of (D) in the present procedure includes the procedure of (E) in the present procedure and/or the procedure of (F) in the present procedure. The procedure of (E) in the present procedure may include the service request procedure for the emergency call and/or the first procedure, and the procedure of (F) in the present procedure may include the access network selection by the UE.

Furthermore, the first procedure may include the handover procedure and/or the handover procedure or the redirection procedure. For example, the first procedure may be the handover procedure to the access network_A' connected to the core network_B, or may be the handover procedure between the 5GS and EPS systems or the RRC Redirection procedure to the EPS.

Furthermore, in the second procedure, any one or a combination of the registration procedure of the UE to the network (the access network, the core network, the CS network, the PDN, the DN), and/or the session establishment procedure, and/or the bearer establishment procedure may be performed. Here, for example, the registration procedure with the network may be a Registration Procedure with the 5GC, may be an Attach Procedure for the emergency call to the EPC, or may be location registration with the CS network. Furthermore, the session establishment may be a PDU Session establishment procedure for the emergency call to the core network_B, or may be a PDN Connectivity Procedure for an emergency call bearer (Emergency Bearer) to the EPC.

Furthermore, the IMS procedure for the emergency call may include IMS Registration for the emergency call and/or an IMS emergency call connection procedure.

Furthermore, the details of the broadcast information, the RRC procedure, the registration procedure with the core network, the service request procedure (for the emergency call), the PDU session establishment procedure (for the emergency call), the IMS registration procedure (for the emergency call), and the IMS emergency call connection procedure will be described later.

Specifically, the UE_A 10 and each apparatus perform the procedure (A) in the present procedure, and the UE_A 10 acquires network capability information of the core network and/or the access network. Here, the UE_A 10 may acquire and store one or more pieces of network capability information of the radio access system and/or the core network in the procedure (B) and/or the procedure (C) of the present procedure.

Subsequently, a registration procedure with respect to the core network is performed (S1020). Based on completion of the registration procedure of the UE_A 10 with the core network, each apparatus transitions to the first state (S1030). Specifically, by performing the registration procedure by the UE_A 10 and each apparatus, the UE_A 10 may transition to a state of being registered with the network (RM-REGISTERED state).

Next, the UE_A 10 in the first state determines the emergency call connection execution (S1040). The determination of the emergency call connection execution by the UE may be based on operation of a user of the UE, or may be based on software processing inside the UE or the like. Furthermore, subsequent behaviors may be performed based on the information acquired by the UE from the network (the access network and/or the core network) in the procedure of (A) in the present procedure and/or the registration procedure with the core network, and the details thereof will be described later.

Next, the UE_A 10 that has determined the emergency call connection execution (S1040) may perform the first condition determination according to the present procedure. The first condition determination is intended to determine whether or not the network (the core network and/or the access network) with which the UE has registered supports the emergency call connection. Here, the first condition determination may be based on various pieces of information acquired by the UE_A 10 in the foregoing procedure. In a case that the first condition determination is true, the UE_A 10 performs subsequent procedures (the second procedure and the IMS procedure for the emergency call) without performing the procedure of (D) in the present procedure. In a case that the first condition determination is false, the procedure of (D) in the present procedure is performed.

Next, in a case that the first condition determination is false, the UE_A 10 performs the second condition determination in the present procedure. The UE_A 10 may initiate the procedure of (E) in the present procedure or the procedure of (F) in the present procedure, based on the second condition determination. In the procedure of (E) in the present procedure, the UE_A 10 may perform the Service Request procedure for the emergency call (S1050), or may or may not perform the first procedure, based on the execution and/or completion of the service request procedure. Furthermore, the UE_A 10 may perform the procedure of (F) in the present procedure, and may select an appropriate network (the access network and/or the core network) for the emergency call connection. Details of the procedure of (D) in the present procedure will be described below. The UE_A 10 may complete the procedure of (D) in the present procedure, based on completion of the procedure of (F) in the present procedure and/or completion of (F) in the present procedure.

Next, the UE_A 10 performs the second procedure in the present procedure. As the second procedure in the present procedure, as described above, any one or a combination of the registration procedure of the UE with a network (the access network, the core network, the CS network, the PDN, the DN), and/or the session establishment procedure, and/or the bearer establishment procedure may be performed. Note that the UE_A 10 may perform the second procedure, based on information acquired and/or stored in the foregoing present procedure. Furthermore, the UE may perform the second procedure, based on a network policy, a UE policy, or the like, not only limited to the pieces of information described above. Details of the second procedure will be described below.

Next, the UE_A 10 performs the IMS procedure for the emergency call (S1080). As described above, the UE_A 10 may perform the IMS Registration for the emergency call and/or the IMS emergency call connection procedure. With the UE_A 10 performing the IMS procedure for the emergency call via the network (the access network and/or the core network) connected in the second procedure described above, registration of the UE_A 10 with the IMS_A 7 providing the IMS service via the core network and the IMS emergency call connection are established. Here, the IMS registration may be IMS registration for the emergency call connection.

The present procedure is completed by the above procedure.

Note that each apparatus may exchange and/or acquire various pieces of capability information and/or request information of each apparatus in the broadcast information and/or the RRC procedure and/or the registration procedure with respect to the core network and/or the service request procedure for the emergency call.

Furthermore, each apparatus involved in the present procedure may transmit and/or receive each control message described in the present procedure to transmit and/or receive one or more pieces of identification information included in each control message and store each piece of identification information transmitted and/or received as a context.

Note that, for the sake of simplicity, the service request procedure and/or the PDU session establishment procedure and/or the IMS registration procedure and/or the IMS emergency call connection procedure may be collectively referred to as the emergency call connection processing.

3.1. Overview of Broadcast Information

First, an overview of broadcast information will be described. Note that the broadcast information corresponds to the broadcast information (S1000) illustrated in FIG. 10 described above.

The broadcast information may be included in a message and/or a signal and/or a beacon frame transmitted from an AN and/or an apparatus of a radio access system constituting the AN to the UE_A 10. Furthermore, the broadcast information may include the 10th identification information and/or the 11th identification information.

Here, the UE_A 10 may recognize whether the radio access system to which the UE_A 10 attempts to connect supports the establishment of radio connection for the emergency service based on the 10th identification information and/or the 11th identification information included in the broadcast information. Furthermore, the UE_A 10 may store these pieces of information in the context that the UE_A 10 holds. Furthermore, the UE_A 10 may store these pieces of information in the context that the UE_A 10 holds.

Furthermore, the UE_A 10 may transition to the state 1 based on the reception of the broadcast information/and or the completion of the RRC procedure described below and the registration procedure with respect to the core network described below.

3.2. Overview of RRC Procedure

Hereinafter, an RRC procedure will be described. In the following, the RRC procedure is also referred to as the present procedure. Note that the present procedure corresponds to the RRC procedure (S1010) illustrated in FIG. 10 described above.

The RRC procedure may include execution of transmission of a message and/or a signal for a request for establishment of radio connection for the UE_A 10 to perform the emergency call connection for the AN or the apparatus of the radio access system configuring the AN, and execution of transmission of a message and/or a signal of a response from the apparatus of the radio access system for the message and/or the signal from the UE_A 10. Furthermore, the message and/or the signal transmitted by the UE_A 10 to the apparatus of the radio access system in the RRC procedure may include information indicating the request for establishment of radio connection for the UE_A 10 to perform the emergency call connection. Furthermore, the message and/or the signal received from the apparatus of the radio access system that is received by the UE_A 10 in the RRC procedure may include the 10th identification information and/or the 11th identification information.

Here, for example, the UE_A 10 may request the establishment of the radio connection for performing the emergency call connection by transmitting information indicating the request for establishment of the radio connection for the UE_A 10 to perform the emergency call connection, or may recognize that the request has been accepted by receiving the 10th identification information and/or the 11th identification information.

Furthermore, for example, the UE_A 10 may recognize whether or not the radio access system supports the radio connection for performing the emergency call connection, based on the fact that the 10th identification information and/or the 11th identification information is included in the message and/or the signal from the apparatus of the radio access system. Furthermore, the UE_A 10 may store these pieces of information in the context that the UE_A 10 holds and/or stores.

3.3. Overview of Registration Procedure with Respect to Core Network

First, an overview of the registration procedure will be described. The registration establishment procedure is also referred to as a present procedure below.

The present procedure is a procedure initiated by the UE_A 10 to perform registration in a network (the access network and/or the core network_B 190 and/or the DN (DN_A 5 and/or PDN_A 6)). In a state in which the UE_A 10 is not registered in the network, the UE_A 10 can perform the present procedure at any timing such as the timing of turning on power. In other words, the UE_A 10 may initiate the present procedure at any timing in a non-registered state (RM-DEREGISTERED state). In addition, each apparatus may transition to a registered state (RM-REGISTERED state), based on the completion of the registration procedure.

Furthermore, the present procedure may be a procedure for updating location registration information of the UE_A 10 in the network, for regularly notifying a state of the UE_A 10 from the UE_A 10 to the network, and/or for updating particular parameters related to the UE_A 10 in the network.

The UE_A 10 may initiate the present procedure in a case that the UE_A 10 applies mobility across TAs. In other words, the UE_A 10 may initiate the present procedure in a case that the UE_A 10 moves to a TA different from a TA indicated in a TA list that the UE_A 10 holds. Furthermore, the UE_A 10 may initiate the present procedure in a case that a running timer expires. Furthermore, the UE_A 10 may initiate the present procedure in a case that a context of each apparatus needs to be updated due to disconnection or deactivation of a PDU session. Furthermore, the UE_A 10 may initiate the present procedure in a case that a change occurs in capability information and/or preference concerning PDU session establishment of the UE_A 10. Furthermore, the UE_A 10 may initiate the present procedure regularly. Note that, besides the above, the UE_A 10 can perform the present procedure at any timing as long as a PDU session is established.

Note that the registration procedure with the core network described above may be the registration procedure for the emergency call service, and the UE_A 10 may configure Emergency Registration as a registration type, for example, as the identification information for requesting registration for the emergency call service in a Registration Request message in the present procedure and perform transmission.

Figure 10:
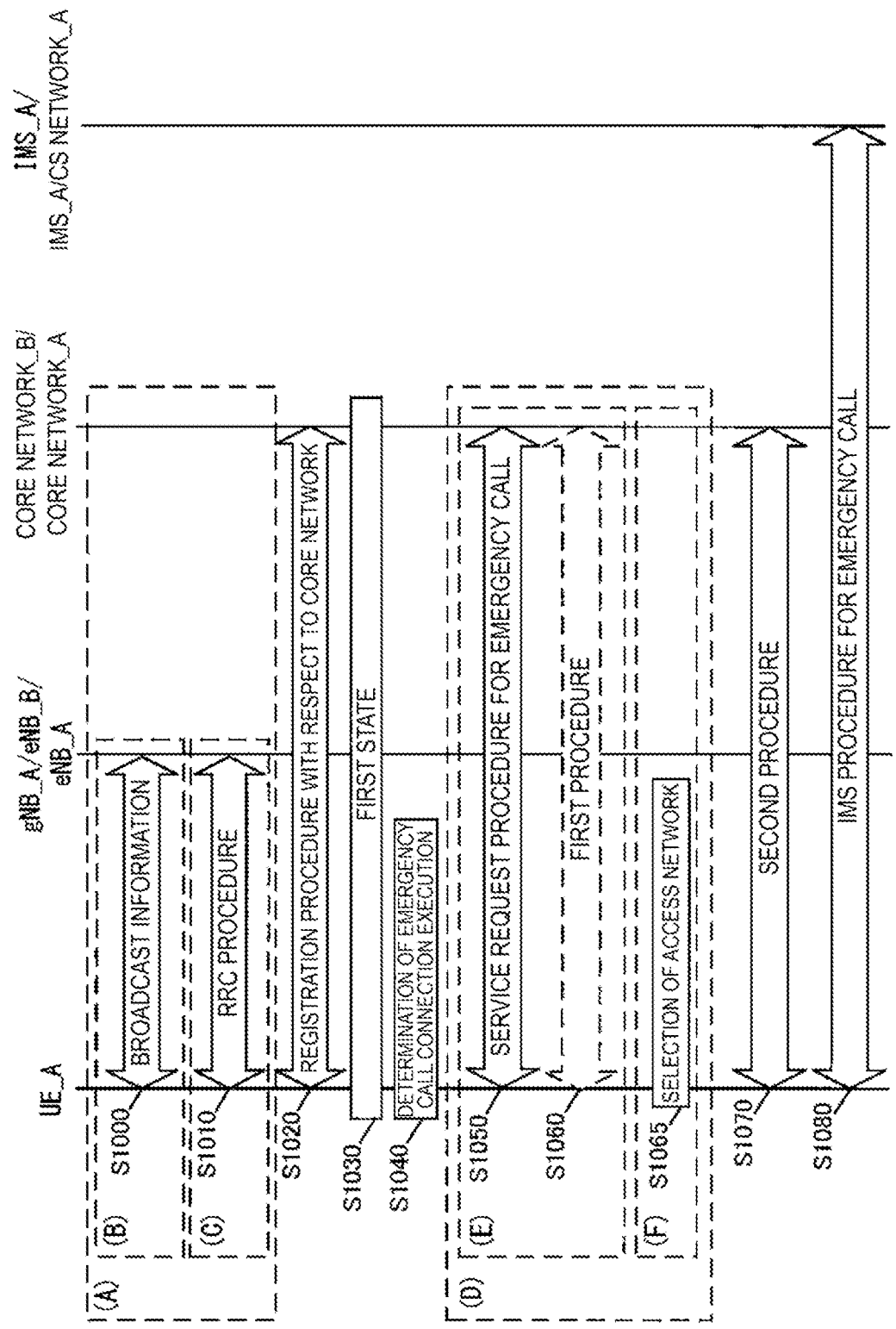
FIG. 10 is a diagram illustrating various procedures for each embodiment.

Furthermore, after completion of the registration procedure with the core network, each apparatus may transition to the first state, and each apparatus in the first state may perform subsequent processing and procedures illustrated in FIG. 10 described above.

3.3.1. Example of Registration Procedure with Respect to Core Network

Using FIG. 11, an example procedure to perform a registration procedure with respect to the core network will be described. Hereinafter, the present procedure refers to a registration procedure to the core network. Note that the present procedure corresponds to the registration procedure with respect to the core network (S1020) illustrated in FIG. 10 described above.

Each step of the present procedure will be described below.

First, the UE_A 10 transmits a registration request message to the AMF_A 240 via the gNB_A 122 or eNB_B 145 (S1100, S1102, and S1104) to initiate the registration procedure. In addition, the UE_A 10 transmits a Session Management (SM) message (e.g., a PDU session establishment request message) included in the registration request message, or transmits the SM message (e.g., the PDU session establishment request message) along with the registration request message to initiate a procedure for SM, such as a PDU session establishment procedure, during the registration procedure.

Specifically, the UE A10 transmits a RRC message including the registration request message to the gNB_A 122 or eNB_B 145 (S1100). In a case that the RRC message including the registration request message is received, the gNB_A 122 or the eNB_B 145 selects the AMF_A 240 as a NF or a common CP function to which the registration request message is routed (S1102). The gNB_A 122 or the eNB_B 145 retrieves the registration request message from the received RRC message and transmits or transfers the registration request message to the selected AMF_A 240 (S1104). Here, the gNB_A 122 or the eNB_B 145 may select the AMF_A 240 based on information included in the RRC message. Furthermore, the registration request message may be a Non-Access-Stratum (NAS) message transmitted and/or received on the N1 interface. In addition, the RRC message may be a control message transmitted and/or received between the UE_A 10 and the gNB_A 122 or the eNB_B 145. Furthermore, the NAS message may be processed in a NAS layer, the RRC message may be processed in a RRC layer, and the NAS layer may be a higher layer than the RRC layer.

In addition, in a case that there are multiple NSIs requesting registration, the UE_A 10 may transmit a registration request message for each of the NSIs, or may transmit multiple registration request messages included in one or more RRC messages. Furthermore, the above-described multiple registration request messages included in one or more RRC messages may be transmitted as one registration request message.

In addition, the UE_A 10 may include the first identification information in the registration request message, and thereby may request information on the support of the voice service and/or emergency service of the network to which the UE_A 10 attempts to connect.

The AMF_A 240 receives the registration request message and/or the control message different from the registration request message and performs first condition determination. The first condition determination is intended to determine whether the network accepts a request from the UE_A 10. The AMF_A 240 initiates the procedure of (A) in the present procedure in a case that the first condition determination is true, and initiates the procedure of (B) in the present procedure in a case that the first condition determination is false.

Each step of the procedure of (A) in the present procedure will be described below. The AMF_A 240 performs a fourth condition determination, and initiates the procedure of (A) in the present procedure. The fourth condition determination is to determine whether the AMF_A 240 transmits and/or receives the SM message to/from the SMF_A 230. In a case that the fourth condition determination is true, the AMF_A 240 select the SMF_A 230 and transmits and/or receive the SM message to and/or from the selected SMF_A 230. In a case that the fourth condition determination is false, the AMF_A 240 skips such processes (S1106).

In addition, the AMF_A 240 transmits the Registration Accept message to the UE_A 10 via the gNB_A 122 or the eNB_B 145 based on the reception of the registration request message from the UE_A 10 and/or the completion of the transmission and/or reception of the SM message to/from the SMF_A 230 (S1108). Here, the registration accept message included in the control message and the RRC message of the N2 interface may be transmitted and/or received. Furthermore, the registration accept message may be a NAS message to be transmitted and/or received on the N1 interface. In addition, the registration accept message may be a response message to the registration request message.

Note that in a case that the AMF_A 240 receives an SM message indicating rejection from the SMF_A 230, the AMF_A 240 may terminate the procedure of (A) in the present procedure, and may initiate the procedure of (B) in the present procedure.

Further, in a case that the fourth condition determination is true, the AMF_A 240 may transmit the SM message such as a PDU session establishment accept message (e.g., a PDU session establishment accept message) included in the registration accept message, or transmit the SM message such as a PDU session establishment accept message (e.g., a PDU session establishment accept message) along with the registration accept message. In addition, this transmission method may be performed in a case that the SM message (e.g., the PDU session establishment request message) is included in the registration request message and the fourth condition determination is true. Furthermore, the transmission method may be performed in a case that the registration request message and the SM message (e.g., the PDU session establishment request message) are included and the fourth condition determination is true. The AMF_A 240 may indicate that the procedure for SM has been accepted by performing such a transmission method.

In addition, the AMF_A 240 may include the 10th identification information and/or the 11th identification information and/or the 12th identification information in the registration accept message, and thereby may indicate that the request from the UE_A 10 has been accepted and indicate the capability information indicating the support of the PDU session function for the voice service and/or emergency service by the radio access system and/or the core network, or may indicate the capability information indicating the support of the voice service and/or emergency service by the same network or a different network (access network and/or core network) in the same PLMN.

Note that the AMF_A 240 may determine whether the 10th identification information and/or the 11th identification information and/or the 12th identification information is to be included in the registration accept message based on received identification information, and/or network capability information and/or an operator policy, and/or a network state, and/or user registration information (user subscription), and the like.

The UE_A 10 receives a registration accept message via the gNB_A 122 or the eNB_B 145 (S1108). The UE_A 10 receives the registration accept message and recognizes the contents of various types of identification information included in the registration accept message.

Furthermore, with the 10th identification information and/or the 11th identification information and/or the 12th identification information being included in the registration accept message, the UE_A 10 may recognize any one of whether or not the radio access system and/or the core network with which the UE_A 10 attempts to register with the present procedure supports the PDU session function for the voice service and/or the emergency call service, or may recognize any one of whether or not the same or a different network (the access network and/or the core network) in the same PLMN supports the voice service and/or the emergency call service. Furthermore, the UE_A 10 may store these pieces of information in the context that the UE_A 10 holds.

Here, for example, in the registration procedure with the core network, the UE_A 10 may perform (E) and/or (F) in the procedure of (D) in the procedure illustrated in FIG. 10 after completion of the present procedure, based on reception of the 10th identification information and/or the 11th identification information and/or the 12th identification information indicating that the radio access system and/or the core network does not support the PDU session function for the emergency call service. Conversely, for example, in the registration procedure with the core network, the UE_A 10 may perform the second procedure (S1070) and/or the IMS procedure for the emergency call (S1080) in the procedure illustrated in FIG. 10 in a case that the UE_A 10 determines the emergency call connection execution (S1040) after completion of the present procedure, based on reception of the 10th identification information and/or the 11th identification information and/or the 12th identification information indicating that the radio access system and/or the core network supports the PDU session function for the voice service or the emergency call service.

The UE_A 10 may further transmit a registration completion (Registration Complete) message to the AMF_A 240 (S1110). Note that, in a case that the UE_A 10 has received an SM message such as a PDU session establishment accept message, the UE_A 10 may transmit the SM message such as the PDU session establishment complete message included in the registration complete message, or may include the SM message therein to indicate that the procedure for SM is completed. Here, the registration complete message may be a NAS message transmitted and/or received on the N1 interface. In addition, the registration complete message may be a response message to the registration accept message. Further, the registration complete message included in the RRC message and a control message of the N2 interface may be transmitted and/or received.

The AMF_A 240 receives the registration complete message (S1110). In addition, each apparatus completes the procedure of (A) in the present procedure based on the transmission and/or reception of the registration accept message and/or the registration complete message.

Next, each step of the procedure of (B) in the present procedure will be described. The AMF_A 240 transmits a registration reject (Registration Reject) message to the UE_A 10 via the gNB_A 122 or the eNB_B 145 (S1112) to initiate the procedure of (B) in the present procedure. Furthermore, the UE_A 10 recognizes that a request of the UE_A 10 has been rejected by receiving the registration reject message or not receiving the registration accept message. Each apparatus completes the procedure of (B) in the present procedure based on the transmission and/or reception of the registration reject message.

Note that, in a case that the fourth condition determination is true, the AMF_A 240 may transmit an SM message such as a PDU session establishment reject message indicating rejection in the registration reject message, or may include the SM message indicating rejection therein to indicate that the procedure for SM has been rejected. In that case, the UE_A 10 may further receive the SM message, such as the PDU session establishment reject message, that indicates rejection, or may recognize that the procedure for SM has been rejected.

Furthermore, the registration reject message may be a NAS message transmitted/received on the N1 interface. In addition, the registration reject message may be a response message to the registration request message. Further, the registration reject message transmitted by the AMF_A 240 is not limited thereto as long as it is a message for rejecting the request of the UE_A 10. In addition, the registration reject message included in the control message and the RRC message on the N2 interface may be transmitted and/or received.

The UE_A 10 recognizes the contents of various types of identification information included in the registration reject message by receiving the registration reject message.

Furthermore, the first condition determination may be performed based on identification information, and/or subscriber information, and/or an operator policy included in the registration request message. For example, the first condition determination may be true in a case that the network allows a request of the UE_A 10. In addition, the first condition determination may be false in a case that the network does not allow a request of the UE_A 10. Furthermore, the first condition determination may be true in a case that the network of a destination of registration of the UE_A 10 and/or an apparatus in the network supports a function requested by the UE_A 10, and may be false in a case that the network and/or the apparatus does not support the function. Note that conditions for determining whether the first condition determination is true or false may not be limited to the above-described conditions.

The fourth condition determination may also be performed based on whether AMF_A 240 has received an SM and may be performed based on whether a SM message is included in the registration request message. For example, the fourth condition determination may be true in a case that the AMF_A 240 has received the SM and/or the SM message is included in the registration request message, and may be false in a case that the AMF_A 240 has not received the SM and/or the SM message is not included in the registration request message. Note that conditions for determining whether the fourth condition determination is true or false may not be limited to the above-described conditions.

3.4. Overview of Service Request Procedure

Next, an overview of the service request procedure will be described. In the following, the service request procedure is also referred to as the present procedure. Note that the service request procedure includes the procedure initiated by the network and the procedure initiated by the UE. In the present embodiment, however, the service request procedure refers to the service request procedure initiated by the UE.

The present procedure is a procedure for requesting establishment of connection via the N1 interface with the AMF in the core network_B initiated by the UE in the disconnected state (CM-IDLE state), and may transition to the connected state (CM-CONNECTED state) after execution of the present procedure. Furthermore, the present procedure is also a procedure for the UE in the disconnected state or the connected state to activate U-Plane connection of the already established PDU session.

Furthermore, the present procedure may be performed as a part of the procedure for the emergency call service fallback (emergency service fallback). Furthermore, the UE_A 10 may perform the present procedure in a case that the UE_A 10 receives the registration accept message in the registration procedure described above including the 10th identification information and/or the 11th identification information and/or the 12th identification information including another access network in the same PLMN supporting the emergency call service from the AMF in the core network_B via the access network_B. The service request procedure as described above is also referred to as the service request procedure for the emergency call.

The UE may perform the first procedure (S1060) and/or the access network selection (S1065) illustrated in FIG. 10, based on reception of the service accept message or the service reject message received in the service request procedure for the emergency call and the RRC message including these.

3.4.1. Service Request Procedure Example for Emergency Call

Figure 4:
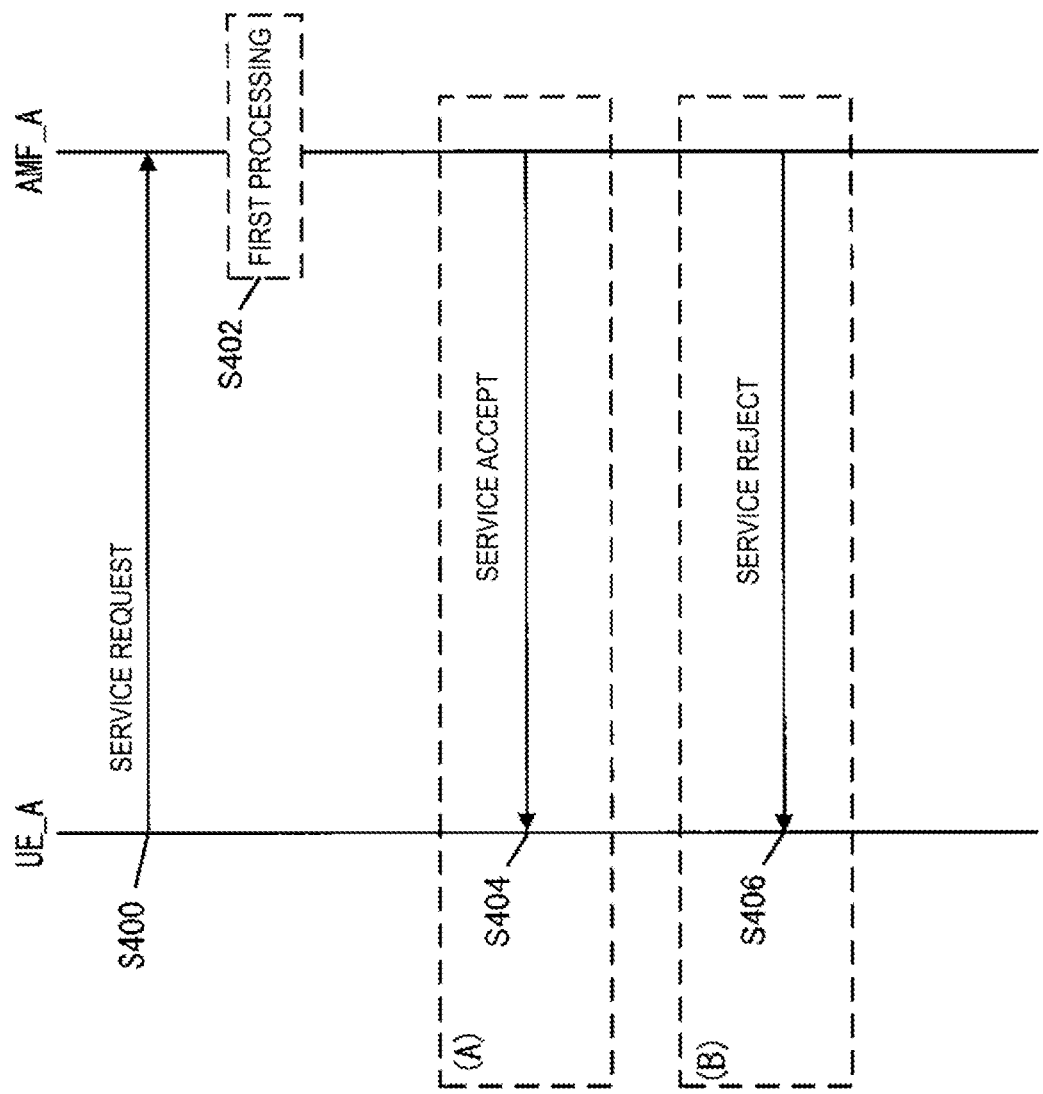
FIG. 4 is a diagram illustrating a service request procedure for an emergency call.

The service request procedure for the emergency call will be described with reference to FIG. 4. In the following, the present procedure refers to the service request procedure for the emergency call. Note that the present procedure corresponds to the service request procedure (S1050) for the emergency call illustrated in FIG. 10 described above. Furthermore, the present procedure example relates to the service request procedure for the emergency call via the access network_B and the core network_B.

Each step of the present procedure will be described below.

First, the UE_A 10 transmits a service request message for the emergency call to the AMF_A 240 via the access network_B (S400). Here, the UE_A 10 may include the 30th identification information for requesting handover and/or redirection to another network different from the connected network (the access network and/or the core network) in the service request message for the emergency call. In other words, the UE_A may indicate that it is the service request for the emergency call by including the 30th identification information in the service request message.

Next, the AMF_A may perform the first condition determination, based on the service request message for the emergency call received from the UE_A via the access network. The first condition determination may be performed based on the identification information included in the service request message that the AMF_A receives from the UE_A and/or the capability information of the network (access network and/or core network) and/or the network policy and/or the user subscription information and/or a combination of these.

Here, for example, the first processing in the present procedure performed by the AMF_A may include transmission and/or reception of the SM message to the SMF_A, may include transmission of the N2 request message to the access network for the emergency fallback.

Furthermore, the AMF_A may perform the first processing in a case that the first condition determination is true, and may perform the following step without performing the first processing in a case that the first condition determination is false. In other words, the AMF_A may perform (A) or (B) in the present procedure, based on completion of the first processing, or may perform (A) or (B) in the present procedure after reception of the service request message in a case that the first processing is not performed.

Next, the AMF_A may perform the second condition determination, based on the identification information included in the service request message for the emergency call from the UE_A and/or completion of the first processing and/or results of the first processing. The second condition determination is intended to determine whether the network accepts a request from the UE_A. The AMF_A 240 initiates the procedure of (A) in the present procedure in a case that the first condition determination is true, and initiates the procedure of (B) in the present procedure in a case that the first condition determination is false.

Furthermore, in the procedure of (A) in the present procedure, the AMF_A may transmit the service accept message to the UE_A via the access network (S404). Furthermore, the UE_A may recognize that the request from the UE_A has been accepted by the network by receiving the service accept message or the RRC message including or meaning the service accept message via the access network.

Furthermore, in the procedure of (B) in the present procedure, the AMF_A transmits the service reject message to the UE_A via the access network (S406). Here, the AMF_A may transmit, to the UE_A 10, the 40th identification information indicating rejection of the service request for the emergency call and/or the access domain of the emergency call reconnection by the UE_A included in the service reject message. Furthermore, the UE_A may recognize that the request from the UE_A has been rejected by the network by receiving the service reject message or the RRC message including or meaning the service reject message via the access network, or may perform the emergency call reconnection after completion of the present procedure, based on the identification information included in the service reject message.

The present procedure may be completed, based on completion of the procedure of (A) or (B) in the present procedure.

3.5. Overview of PDU Session Establishment Procedure

Next, an overview of the PDU session establishment procedure performed to establish a PDU session with the DN will be described. The PDU session establishment procedure is also referred to as a present procedure below. Note that the present procedure is an example of the procedure performed in the second procedure (S1070) illustrated in FIG. 10 described above.

The present procedure is a procedure for each apparatus to establish the PDU session. Note that the PDU session established in the present procedure may be a procedure for establishing the PDU session for the emergency call service, and the UE_A 10 may transmit a registration signal including information explicitly indicating PDU session establishment dedicated to the emergency call in the present procedure. Here, the UE_A 10 and/or each apparatus in the network may perform the present procedure, based on completion of the procedure up to the second procedure of FIG. 10 described above. Each apparatus may establish the PDU session, based on completion of the present procedure. Furthermore, each apparatus may perform the present procedure multiple times to establish multiple PDU sessions.

Furthermore, the UE_A 10 may perform the present procedure in a case that the UE_A 10 receives the identification information indicating that the radio access system and the core network supports the PUD session function for the emergency call in the registration procedure with the core network described above.

Furthermore, the UE_A 10 may acquire an address of the P-CSCF during the present procedure or based on the completion of the present procedure. Furthermore, here, the address of the P-CSCF acquired by the UE_A 10 may be an address of the P-CSCF_B capable of handling the PDU session for the emergency call. Specifically, the core network having received from the UE_A 10 the information explicitly indicating the establishment of the PDU session for the emergency call may select an external gateway that can handle the PDU session dedicated to the emergency call. The gateway, in the core network, that can handle the PDU session dedicated to the emergency call may select the P-CSCF_B 310 that can handle the PDU session dedicated to the emergency call and transmit to the UE_A 10 a response to a request of establishment of the PDU session dedicated to the emergency call, the response including the address of the P-CSCF B 310 that can handle the PDU session dedicated to the emergency call.

3.6. Summary of IMS Registration Procedure

First, an overview of an IMS registration procedure will be described. The present procedure hereinafter indicates the IMS registration procedure. Note that the IMS registration procedure is a UE_A 10 initiated procedure for registration to the IMS.

The initiation of the present procedure may be performed based on completion of the second procedure (S1070) in the procedure illustrated in FIG. 10 by the UE_A 10. Note that the state may be a state in which any one or a combination of registration of the UE with the network (the access network, the core network, the CS network, the PDN, the DN) and/or session establishment and/or bearer establishment has been completed, based on completion of the second procedure.

Specifically, for example, the initiation of the present procedure may be any timing in a state in which the PDU session is established for the UE_A 10 and/or each apparatus in the network. Here, the established PDU session may be based on the PDU session establishment procedure for the emergency call performed as the second procedure (S1080) of the procedure illustrated in FIG. 10 described above. Note that the PDU session establishment procedure may be the PDU session establishment procedure for the emergency call. The UE_A 10 having completed the PDU session establishment procedure may initiate the present procedure at any time in a case that the UE_A 10 is not registered to IMS, that is, an IP address of the UE_A 10 is not associated with a public user identity assigned from a network. In addition, the UE_A 10 and each IMS apparatus may also recognize a state of being registered, that is, the IP address of the UE_A 10 is associated with the public user identity assigned from the network.

Furthermore, the present procedure determines the path of the Session Initiation Protocol (SIP) message in the IMS procedure after the IMS registration procedure.

3.6.1. Example of IMS Registration Procedure

Figure 12:
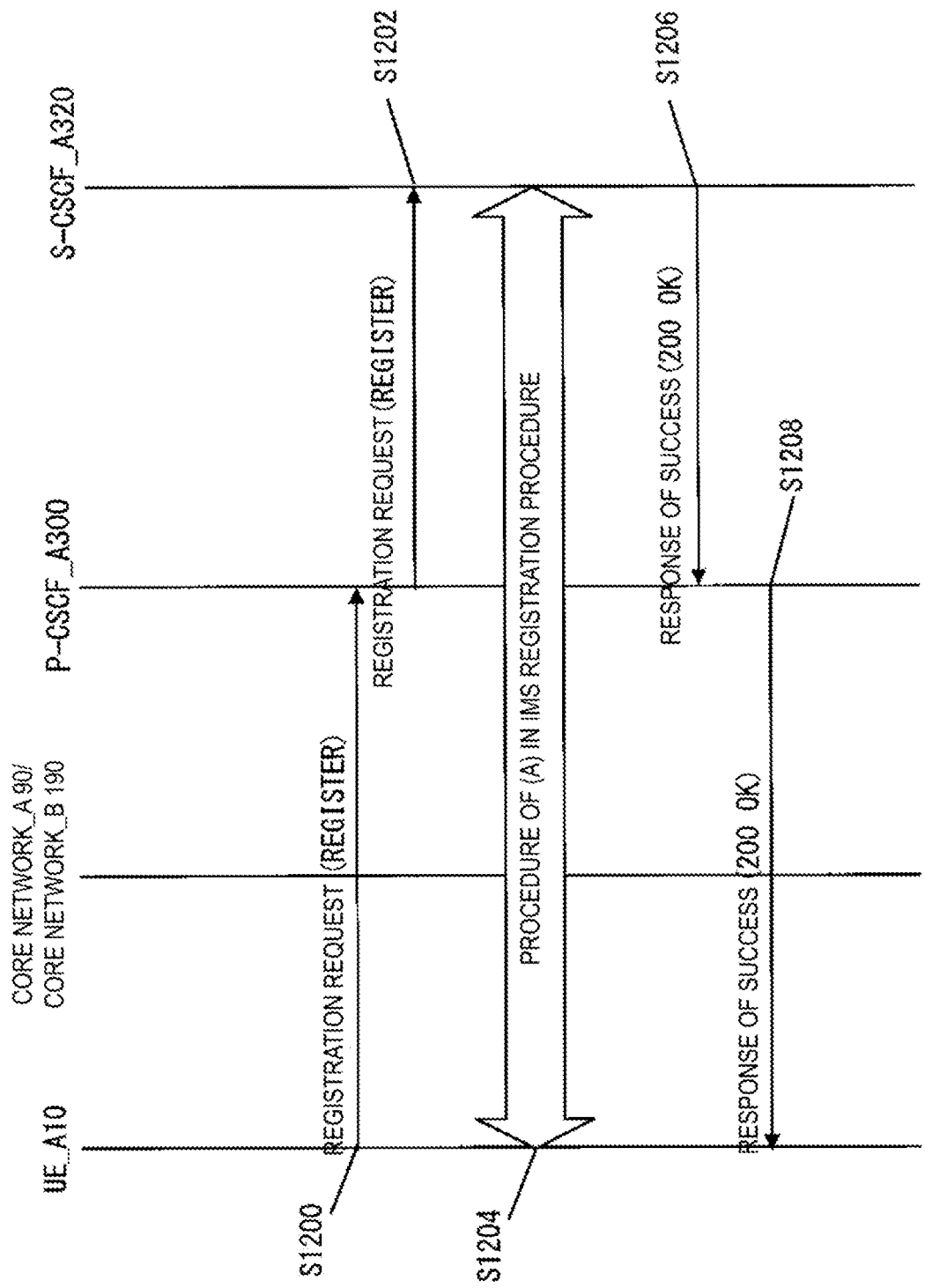
FIG. 12 is a diagram illustrating an IMS registration procedure.

An example of an order of the IMS registration procedure will be described using FIG. 12. The present procedure hereinafter indicates the IMS registration procedure. Note that the present procedure may be a procedure included in the IMS registration procedure (S1080) for the emergency call. Furthermore, the present procedure may be performed in a case of emergency call connection via the core network_A and/or the core network_B. Each step of the present procedure will be described below.

First, the UE_A 10 transmits a REGISTER signal (S1200) for an IMS registration request for the emergency call to the P-CSCF_B 310 dedicated to the emergency call indicated by the network in the second procedure described above (S1070). Note that the second procedure may be the PDU session establishment procedure for the emergency call, for example.

Next, the P-CSCF_A 300 that has received the REGISTER signal for the emergency call transfers the REGISTER signal for the emergency call to the E-CSCF_A 330 via the I-CSCF, the ATCF, or the IBCF based on service area information of the UE_A 10 and the operator policy for the signal path (S1202). Specifically, the UE_A 10 transmits the REGISTER signal (S1204) that includes information explicitly indicating IMS registration for the emergency call connection in the Contact header to the P-CSCF_B 310 dedicated to emergency calls.

Next, the P-CSCF_B 310 that has received the REGISTER signal transfers the REGISTER signal to the E-CSCF via the I-CSCF, the ATCF, or the IBCF based on the service area information of the UE_A 10 and the operator policy related to the signal path.

Next, the E-CSCF_A 330 that has received the REGISTER signal for the emergency call detects the IMS registration for the emergency call connection based on the information explicitly indicating the IMS registration for the emergency call connection in the Contact header, generates IMS registration information by causing the contact address in the Contact header, the information explicitly indicating the IMS registration for the emergency call connection, and the public user identity to be registered to be associated with each other, and then holds the IMS registration information.

The S-CSCF that has generated the IMS registration information for the emergency call transmits, to the UE_A 10, "200 OK" including information indicating that the IMS registration for the emergency call has been completed as a response to the IMS registration request (S1206) (S1208), and the present procedure is completed.

3.7. Overview of IMS Emergency Call Connection Procedure

Next, an overview of an IMS emergency call connection procedure will be described. In the following, the IMS emergency call connection procedure is also referred to as the present procedure. The present procedure may include an IMS emergency call connection procedure using an emergency call-dedicated PDU session and/or an IMS emergency call connection procedure using a normal PDU session and/or a Circuit Switching (CS) emergency call connection procedure. Details of each procedure will be described below. Note that the present procedure is a procedure in the IMS procedure for the emergency call (S1080) illustrated in FIG. 10, and may be initiated based on execution completion of the second procedure (S1070) and/or the IMS registration procedure for the emergency call in the IMS procedure for the emergency call.

Figure 13:
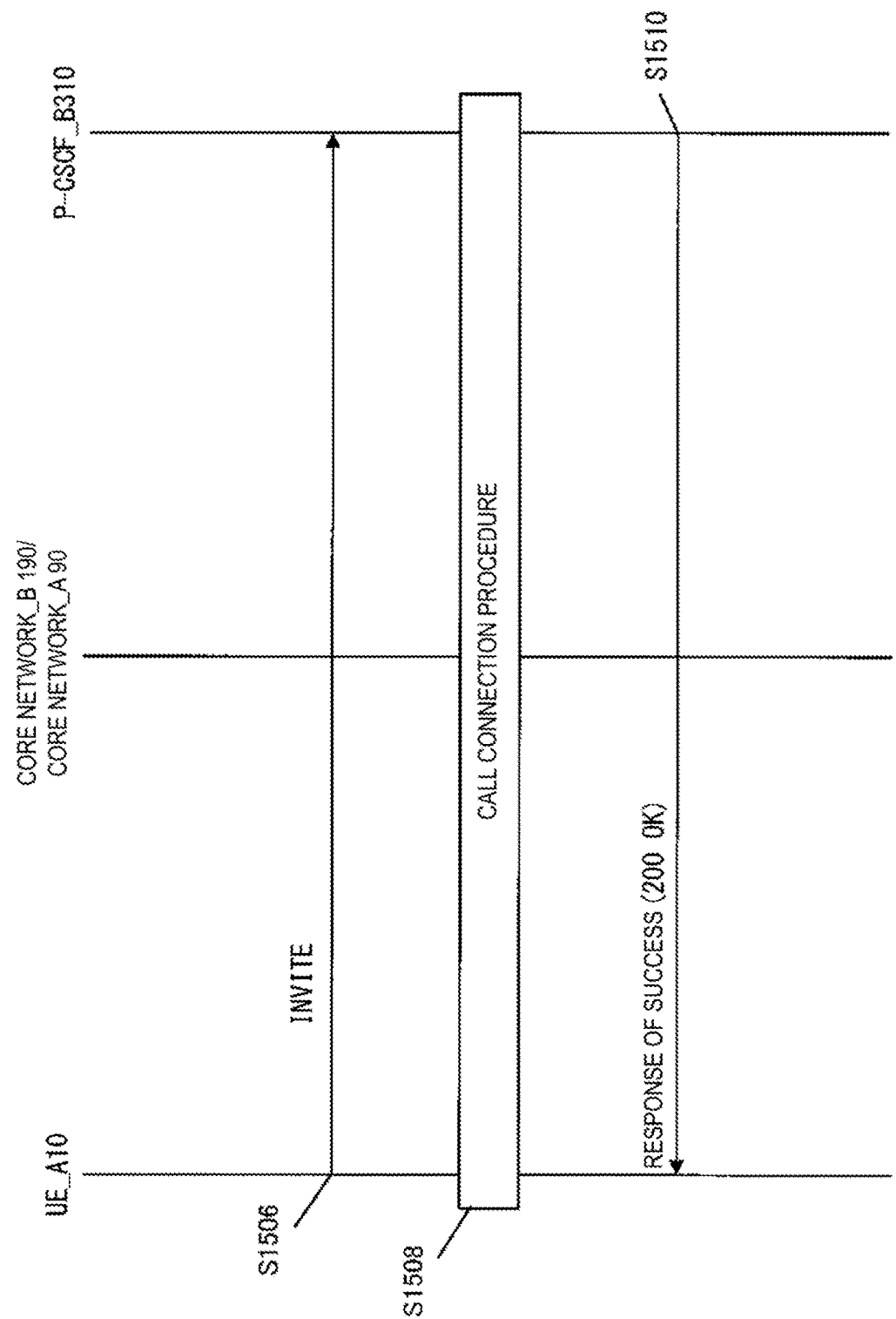
FIG. 13 is a diagram illustrating a procedure for connecting an IMS emergency call.

3.7.1. Example of IMS Emergency Call Connection Procedure Using Emergency Call-Dedicated PDU Session The IMS emergency call connection procedure using an emergency call-dedicated PDU session will be described using FIG. 13. The present procedure hereinafter indicates the IMS emergency call connection procedure. Note that the present procedure may be a procedure included in the IMS registration procedure (S1080) for the emergency call. Furthermore, the present procedure may be performed in a case of emergency call connection via the core network_A and/or the core network_B. For example, the UE_A 10 may transmit an IMS emergency call connection signal by using the established PDU session dedicated to the emergency call. Each step of the present procedure will be described below.

Next, after completing the IMS registration for the emergency call connection, the UE_A 10 transmits the INVITE including information indicating an emergency call-dedicated signal to the P-CSCF_B 310 (S1506) and requests an SIP dialog forming dedicated to the emergency call.

Specifically, the UE_A 10 configures a path for the SIP signal based on path information received in the IMS registration for the emergency call connection, and transmits an INVITE signal in which an emergency service URN indicating an emergency call connection is configured in the request URI and the To header to the P-CSCF_B 310 dedicated to the emergency call for which a path has been configured (S1506). The P-CSCF_B 310 that has received the INVITE creates an emergency call-dedicated connection path, transfers the INVITE signal to the emergency station via the emergency call-dedicated CSCF (E-CSCF), or the like, and requests dialog forming dedicated to the emergency call. The P-CSCF_B 310 that has received notification of the successful dialog forming transmits "200 OK" for notifying the success of the dialog forming dedicated to the emergency call to the UE_A 10 (S1510).

3.7.2. Example of CS Emergency Call Connection Procedure

Next, a CS emergency call connection procedure (hereinafter referred to as present procedure) will be described. Note that the present procedure may be a procedure included in the IMS registration procedure (S1080) for the emergency call. Furthermore, the present procedure may be performed in a case of emergency call connection via the CS network.

The present procedure is a procedure for the emergency call connection via the CS network, and the UE_A 10 may perform the emergency call connection procedure via the CS network, based on each procedure described above, and/or various pieces of information received in each procedure described above, and/or the network policy, and/or the UE policy. Furthermore, the UE_A 10 may perform the present procedure after performing the location registration for the emergency call with the CS network as the second procedure described above.

The UE_A 10 that has received a reject or redirection message from the IMS_A 7 detects whether the core network to which the UE_A 10 is connected supports the emergency call-dedicated PDU session function, and in a case that the core network does not support the emergency call-dedicated PDU session function and in a case that another core network in the same PLMN does not support the voice service function, or in a case that the other core network in the same PLMN supports the voice service function and does not support the emergency call-dedicated PDU session function, the UE_A 10 may make a Circuit Switching (CS) emergency call connection.

Specifically, in a case that the UE_A 10 detect that the core network to which the UE_A 10 attempts to connect or has been connected does not support the emergency call-dedicated PDU session function based on the registration procedure or the broadcast information, and in addition another core network in the same PLMN does not support the voice service function based on the network function information or network capability information of the other core network in the same PLMN acquired in the registration procedure described above, the UE_A 10 may perform the CS emergency call connection.

In a case that another core network in the same PLMN supports the voice service function and does not support the emergency call-dedicated PDU session function based on the network function information of the other core network in the same PLMN acquired in the registration procedure, the UE_A 10 checks the service area location. At this time, the CS emergency call connection may be made in a case that the UE_A 10 is served in another network.

In addition, in a case that the redirection message does not include information that prompts the other core network in the same PLMN supporting the voice service function and the emergency call-dedicated PDU session function to make the IMS emergency call connection, the UE_A 10 checks the service area location. At this time, the present procedure may be performed in a case that the UE_A 10 is served in another network.

4. Embodiments

Each embodiment according to the present invention will be described below.

4.1 First Embodiment

Figure 11:
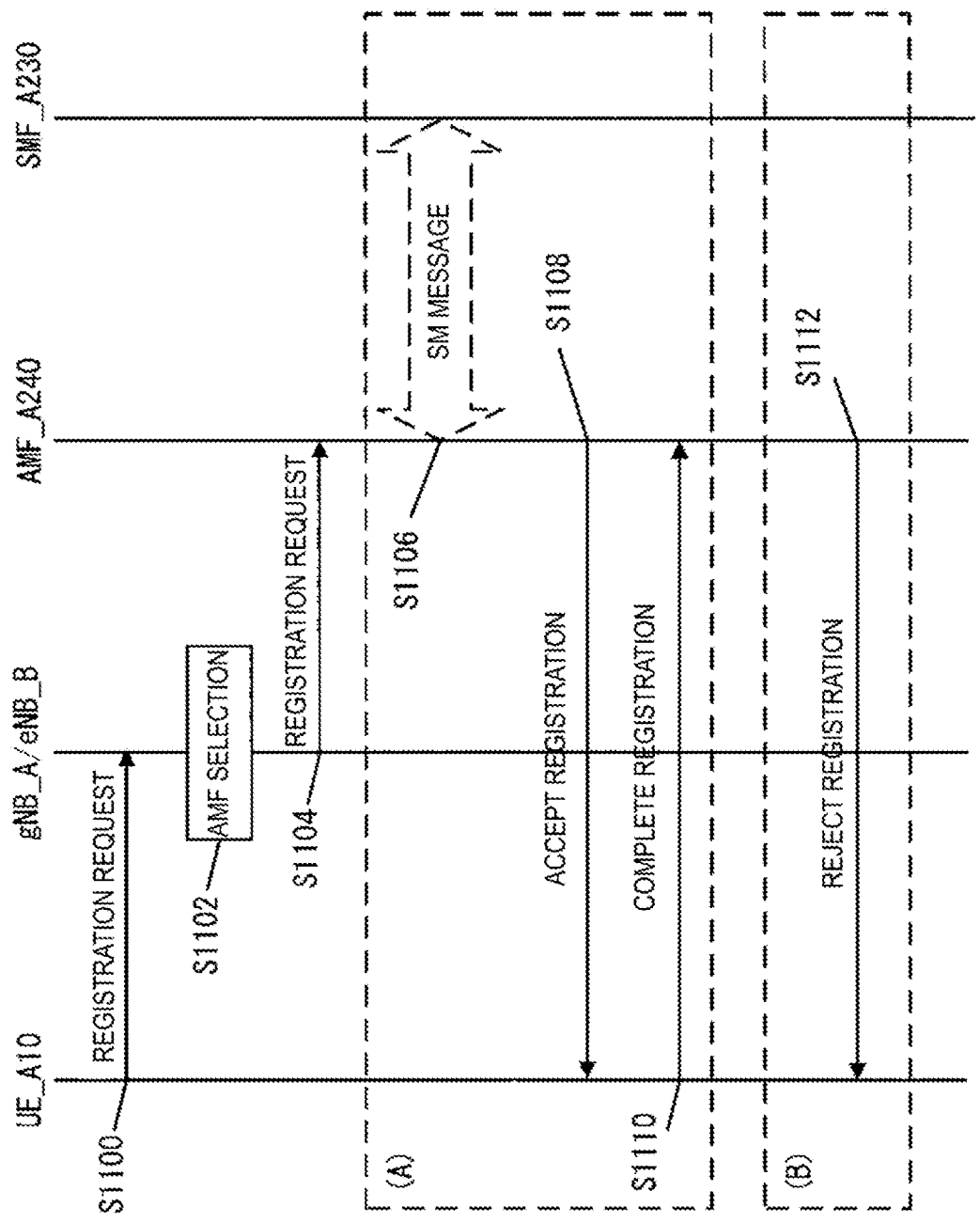
FIG. 11 is a diagram illustrating a registration procedure.

With reference to FIG. 10 and FIG. 11, the first embodiment according to the present invention will be described. In the following, the first embodiment is also referred to as the present embodiment.

The present embodiment mainly relates to the registration procedure with the core network illustrated in FIG. 10 (S1020; hereinafter simply also referred to as the registration procedure) and behaviors of the procedure of (D) in the procedure illustrated in FIG. 10 based on completion of the registration procedure. Furthermore, the present embodiment relates to a case that the 11th identification information and/or the 12th identification information is included in the registration accept message (S1108) that the UE_A receives from the core network_B in the registration procedure with the core network (S1020).

The UE_A and/or each apparatus that has determined the emergency call connection execution (S1040) after completion of the register procedure with the core network (S1020) according to the details of the 11th identification information and/or the 12th identification information included in the registration accept message received by the UE_A performs the following behaviors in subsequent procedures.

For example, in a case that the 11th identification information included in the registration accept message received by the UE_A indicates that the emergency call service via the access network A' connected to the core network B190 is enabled and the 12th identification information indicating the emergency call connection scheme indicates support, in execution of the emergency call connection processing, as the emergency call connection scheme, the UE_A 10 selects a service request (SERVICE REQUEST) including the 30th identification information (S1050), and starts and performs redirection and/or handover processing to the access network A' connected to the core network B190 by the network (S1060).

Furthermore, for example, in a case that the 11th identification information included in the registration accept message received by the UE_A indicates that the emergency call service via the access network_A' connected to the core network_B 190 is enabled and the 12th identification information indicating the emergency call connection scheme indicates non-support, in execution of the emergency call connection processing, as the emergency call connection scheme, the UE_A 10 may select the access network A connected to the core network A90 (S1065), and may perform subsequent procedures via the selected network.

Furthermore, behaviors after the registration accept message including the 11th identification information and/or the 12th identification information is transmitted and/or received need not be limited to these.

4.2. Second Embodiment

With reference to FIG. 10 and FIG. 11, the second embodiment according to the present invention will be described. In the following, the second embodiment is also referred to as the present embodiment.

The present embodiment mainly relates to the registration procedure with the core network illustrated in FIG. 10 (S1020; hereinafter simply also referred to as the registration procedure) and behaviors of the procedure of (D) in the procedure illustrated in FIG. 10 based on completion of the registration procedure. Furthermore, the present embodiment relates to determination of the details of the 11th identification information and/or the 12th identification information included in the registration accept message (S1108) transmitted from the core network and transmission to the UE_A in the registration procedure with the core network (S1020).

In determination of the details of the 11th identification information and/or the 12th identification information included in the registration accept message transmitted from the core network and transmission to the UE_A, the following behaviors may be performed.

For example, in a case that the core network indicates the 12th identification information in the registration accept message in the registration procedure, the 12th identification information may be indicated in consideration of not only the presence or absence of support of the emergency call service but also the presence or absence of support of the voice call service.

More specifically, the core network_B 190 may perform the 1st procedure example illustrated below.

Furthermore, in a case that the core network_B 190 notifies the UE_A 10 of the 12th identification information and the 11th identification information indicates that the emergency call service via the core network_B 190 indicates non-support regardless of the access network, the core network_B 190 may perform notification of the support by using the 12th identification information only in a case that the voice service is supported via the core network A being another core network in the same PLMN as the core network_B 190.

Furthermore, the core network_B 190 may perform the 2nd procedure example illustrated below that is different from the 1st procedure example.

Furthermore, in a case that the core network_B 190 notifies the UE_A 10 of the 12th identification information and the 11th identification information indicates support of the emergency call service only via the access network A' connected to the core network_B 190, the core network_B 190 may perform notification of support by using the 12th identification information only in a case that the voice service is supported by the access network A' connected to the core network_B 190.

Furthermore, in the present embodiment, the 12th identification information notified by the core network may further include information meaning support of the voice call service as well as support of the emergency call service.

In this case, the UE_A 10 transmits the service request (SERVICE REQUEST) including the 30th identification information (S1050) to the core network for handover or redirection to the access network and/or the core network supporting the emergency call service, based on the 12th identification information.

The UE_A and/or each apparatus that has determined the emergency call connection execution (S1040) after completion of the register procedure with the core network (S1020) based on the details of the 11th identification information and/or the 12th identification information included in the registration accept message may perform the following procedure.

4.3. Third Embodiment

With reference to FIG. 10, the third embodiment according to the present invention will be described. In the following, the third embodiment is also referred to as the present embodiment.

The present embodiment mainly relates to the registration procedure with the core network illustrated in FIG. 10 described above (S1020; hereinafter simply also referred to as the registration procedure) and/or the service request procedure (S1050) and/or the procedure of (D) in the procedure illustrated in FIG. 10, and behaviors of subsequent procedures.

Specifically, the present embodiment relates to behaviors of the UE_A and each apparatus after reception of the 40th identification information included in the reject message transmitted from the network in the procedure (service request procedure; S1050) of (E) in the procedure illustrated in FIG. 10 performed based on handling of the 11th identification information and/or the 12th identification information included in the registration accept message received in the registration procedure and these.

The above description has illustrated a scheme in which, in the first and second embodiments, the UE_A and/or the core network perform processing based on the 11th identification information and/or the 12th identification information to thereby forestall failure of the emergency call connection and to implement immediate call connection. In the present embodiment, furthermore, in the processing related to the emergency call service, processing to be performed for relieving the emergency call connection after wrong emergency call connection is started may be performed, and each procedure example therefor will be described below.

Specifically, the terminal and the core network may perform the 11th procedure example illustrated below.

The UE_A 10 may store the 11th identification information and/or the 12th identification information after performing the registration procedure in an initial procedure.

Subsequently, after determination of the emergency call connection execution (S1040), the UE_A 10 performs the emergency call connection procedure using the service request (SERVICE REQUEST) including the 30th identification information, based on the 11th identification information and/or the 12th identification information being already stored, and the procedure may be a procedure rejected by the core network_B 190. Note that the reject message may include the 40th identification information.

Here, the 11th identification information stored by the UE_A 10 may be information indicating that the emergency call service via the core network_B 190 is not supported regardless of the access network.

In this case, the UE_A 10 may select the CS domain as access domain and/or domain selection processing, based on reception of the 11th identification information and/or the 12th identification information and/or a service reject (SERVICE REJECT) message from the core network_B 190 in the emergency call reconnection.

Furthermore, the terminal and the core network may perform the 12th procedure example illustrated below that is different from the 11th procedure example.

The UE_A 10 may store the 11th identification information and/or the 12th identification information after performing the registration procedure in the initial procedure.

Subsequently, after determination of the emergency call connection execution (S1040), the UE_A 10 performs the emergency call connection procedure using the service request (SERVICE REQUEST) including the 30th identification information, based on the 11th identification information and/or the 12th identification information being already stored, and the procedure may be a procedure rejected by the core network_B 190. Note that the reject message may include the 40th identification information.

Here, the 11th identification information stored by the UE_A 10 may be information indicating that the emergency call service via the access network_A' connected to the core network_B 190 is supported.

In this case, the UE_A 10 may select the core network_A as the access domain and/or domain selection processing in a case that the UE_A 10 supports the S1 mode, based on reception of the 11th identification information and/or the 12th identification information and/or the service reject (SERVICE REJECT) message from the core network_B 190 in the emergency call reconnection. In a case that the UE_A 10 does not support the S1 mode, the UE_A 10 may select the CS domain as the access domain and/or domain selection processing.

Furthermore, the terminal and the core network may perform the 13th procedure example illustrated below that is different from the 11th procedure example and the 12th procedure example.

The UE_A 10 may store the 11th identification information and/or the 12th identification information after performing the registration procedure in an initial procedure.

Subsequently, after determination of the emergency call connection execution (S1040), the UE_A 10 performs the emergency call connection procedure using the service request (SERVICE REQUEST) including the 30th identification information, based on the 11th identification information and/or the 12th identification information being already stored, and the procedure may be a procedure rejected by the core network_B 190. Note that the reject message may include the 40th identification information.

Here, the 11th identification information stored by the UE_A 10 may be information indicating that the emergency call service via the access network_B and the access network A' connected to the core network_B 190 is supported.

In this case, the UE_A 10 may select the core network A or the access network A' connected to the core network_B 190 as the access domain and/or domain selection processing in a case that the UE_A 10 supports the S1 mode, based on reception of the 11th identification information and/or the 12th identification information and/or the service reject (SERVICE REJECT) reject message from the core network_B 190 in the emergency call reconnection. In a case that the UE_A 10 does not support the S1 mode, the CS domain or the access network A' connected to the core network_B 190 may be selected as the access domain and/or domain selection processing.

Furthermore, the terminal and the core network may perform the 14th procedure example illustrated below that is different from the 11th procedure example to the 13th procedure example.

The UE_A 10 may store the 11th identification information and/or the 12th identification information after performing the registration procedure in an initial procedure.

Subsequently, after determination of the emergency call connection execution (S1040), the UE_A 10 performs the emergency call connection procedure using the service request (SERVICE REQUEST) including the 30th identification information, based on the 11th identification information and/or the 12th identification information being already stored, and the procedure may be a procedure rejected by the core network_B 190. Note that the reject message may include the 40th identification information.

Here, the 40th identification information may include information indicating the CS domain.

In this case, the UE_A 10 may select the CS domain as the access domain and/or domain selection processing, based on reception of the 40th identification information included in the service reject (SERVICE REJECT) message from the core network_B 190 in the emergency call reconnection.

Furthermore, the terminal and the core network may perform the 15th procedure example illustrated in below that is different from the 11th procedure example to the 14th procedure example.

The UE_A 10 may store the 11th identification information and/or the 12th identification information after performing the registration procedure in an initial procedure.

Subsequently, after determination of the emergency call connection execution (S1040), the UE_A 10 performs the emergency call connection procedure using the service request (SERVICE REQUEST) including the 30th identification information, based on the 11th identification information and/or the 12th identification information being already stored, and the procedure may be a procedure rejected by the core network_B 190. Note that the reject message may include the 40th identification information.

Here, the 40th identification information may include information indicating the core network A and/or the access network A being the same PLMN as the core network_B 190.

In this case, the UE_A 10 may select the access network A connected to the core network A as the access domain and/or domain selection processing, based on reception of the 40th identification information included in the service reject (SERVICE REJECT) message from the core network_B 190 in the emergency call reconnection.

Furthermore, the terminal and the core network may perform the 16th procedure example illustrated below that is different from the 11th procedure example to the 15th procedure example.

The UE_A 10 may store the 11th identification information and/or the 12th identification information after performing the registration procedure in an initial procedure.

Subsequently, after determination of the emergency call connection execution (S1040), the UE_A 10 performs the emergency call connection procedure using the service request (SERVICE REQUEST) including the 30th identification information, based on the 11th identification information and/or the 12th identification information being already stored, and the procedure may be a procedure rejected by the core network_B 190. Note that the reject message may include the 40th identification information.

Here, the 40th identification information may include information indicating the core network_B 190 and/or the access network A'.

In this case, the UE_A 10 may select the access network A' connected to the core network_B 190 as the access domain and/or domain selection processing, based on reception of the 40th identification information included in the service reject (SERVICE REJECT) message from the core network_B 190 in the emergency call reconnection.

5. Others

The above description has illustrated an example of an embodiment in which the UE_A 10 initially attempts registration for the emergency call via the access network_B 120 connected to the core network_B and connection to the emergency call service. However, the present invention is not limited to this, and subsequent procedures may be performed after connection/registration to the system including the access network_A' and the core network_B has been attempted.

For example, the UE_A 10 may initially perform the emergency call reconnection via any one of the access network_B connected to the core network_B, or the access network_A connected to the core network_A, or the CS network after the registration for the emergency call via the access network_A' connected to the core network_B and the connection to the emergency call service has failed.

The behavior in this case is the same as that in the procedure described above, and thus description thereof will be omitted.

6. Modified Examples

A program running on an apparatus according to the present invention may serve as a program that controls a Central Processing Unit (CPU) and the like to cause a computer to operate in such a manner as to realize the functions of the embodiment according to the present invention. Programs or information handled by the programs are temporarily stored in a volatile memory such as a Random Access Memory (RAM), a non-volatile memory such as a flash memory, a Hard Disk Drive (HDD), or another storage device system.

Note that a program for realizing such the functions of the embodiment according to the present invention may be recorded on a computer-readable recording medium. This configuration may be realized by causing a computer system to read the program recorded on the recording medium and to perform the program. It is assumed that the "computer system" refers to a computer system built into the apparatuses, and the computer system includes an operating system and hardware components such as a peripheral device. Furthermore, the "computer-readable recording medium" may be a semiconductor recording medium, an optical recording medium, a magnetic recording medium, a medium dynamically holding the program for a short time, or any other computer readable recording medium.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or may be a known processor, a controller, a microcontroller, or a state machine. The above-mentioned electric circuit may include a digital circuit, or may include an analog circuit. Furthermore, in a case that a circuit integration technology that replaces the present integrated circuit appears with advances in semiconductor technology, one or more aspects of the present invention can also use a new integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

REFERENCE SIGNS LIST

1 Mobile communication system
5 DN_A
6 PDN_A
7 IMS_A
10 UE_A
30 PGW_A
35 SGW_A
45 eNB_A
40 MME_A
50 HSS_A
80 ACCESS NETWORK_A
81 ACCESS NETWORK_A'
90 Core network_A
120 ACCESS NETWORK_B
122 gNB_A
145 eNB_B
190 Core network_B
230 SMF_A
235 UPF_A
240 AMF_A
245 UDM_A
290 CS NETWORK_A
300 P-CSCF_A
310 P-CSCF_B
320 S-CSCF_A
330 E-CSCF_A

What is claimed is:

1. A User Equipment (UE), comprising:
a controller configured to register the UE with an evolved packet core (EPC) network and a fifth generation (5G) core (5GC) network via the same serving base station, wherein the EPC network is associated with a first access domain and the 5GC network is associated with a second access domain; and
a transmission/reception unit configured to send a first emergency service request message to the EPC network for establishing an emergency call after the controller registers the UE with the EPC network and the 5GC network, and
receive, in response to sending the first emergency service request message, a response message from the EPC network, wherein:
the controller is further configured to determine whether the response message is accepting or rejecting the first emergency service request, and
when the first emergency service request is determined to be rejected, select the second access domain and cause the transmission/reception unit to send a second emergency service request message to the 5GC network for establishing the emergency call based on the selected second access domain without considering a fallback instruction included in the response message.

2. A communication method performed by a User Equipment (UE), the communication method comprising:
registering with an evolved packet core (EPC) core network and a fifth generation (5G) core (5GC) network via the same serving base station, wherein the EPC network is associated with a first access domain and the 5GC network is associated with a second access domain;
transmitting, after registering with the EPC network and the 5GC network, a first emergency service request message to the EPC network for establishing an emergency call;
receiving a service reject message from the EPC network;
selecting the second address domain after receiving the service reject message from the EPC network; and
transmitting, based on receiving the service reject message from the EPC network, a second emergency service request message to the 5GC network for establishing the emergency call based on the selected second access domain without considering a fallback instruction included in the response message.

3. The communication method of claim 2, wherein the serving base station comprises an evolved-universal mobile telecommunications system (UMTS) terrestrial radio access network (E-UTRAN) base station.

4. The communication method of claim 2, wherein the EPC network and the 5GC network are associated with the same public land mobile network (PLMN).

5. The communication method of claim 2, wherein the first access domain comprises a packet switch domain and the second access domain also comprises the packet switch domain.

6. The communication method of claim 2, wherein the first access domain comprises a circuit switch domain and the second access domain also comprises the circuit switch domain.

7. The communication method of claim 2, wherein the first access domain comprises a circuit switch domain and the second access domain comprises a packet switch domain.

8. The communication method of claim 2, wherein the first access domain comprises a packet switch domain and the second access domain comprises a circuit switch domain.

9. The UE of claim 1, wherein the serving base station comprises an evolved-universal mobile telecommunications system (UMTS) terrestrial radio access network (E-UTRAN) base station.

10. The UE of claim 1, wherein the EPC network and the 5GC network are associated with the same public land mobile network (PLMN).

11. The UE of claim 1, wherein the first access domain comprises a packet switch domain and the second access domain also comprises the packet switch domain.

12. The UE of claim 1, wherein the first access domain comprises a circuit switch domain and the second access domain also comprises the circuit switch domain.

13. The UE of claim 1, wherein the first access domain comprises a circuit switch domain and the second access domain comprises a packet switch domain.

14. The UE of claim 1, wherein the first access domain comprises a packet switch domain and the second access domain comprises a circuit switch domain.

* * * * *